(12) United States Patent
Pamuru

(10) Patent No.: US 11,861,665 B2
(45) Date of Patent: Jan. 2, 2024

(54) ARTIFICIAL INTELLIGENCE MACHINE LEARNING SYSTEM FOR CLASSIFYING IMAGES AND PRODUCING A PREDETERMINED VISUAL OUTPUT

(71) Applicant: Sudheer Kumar Pamuru, Frisco, TX (US)

(72) Inventor: Sudheer Kumar Pamuru, Frisco, TX (US)

(73) Assignee: Concat Systems, Inc., Urbandale, IA (US)

( * ) Notice: Subject to any disclaimer, the term of this patent is extended or adjusted under 35 U.S.C. 154(b) by 109 days.

(21) Appl. No.: 17/683,032

(22) Filed: Feb. 28, 2022

(65) Prior Publication Data

US 2023/0274318 A1 Aug. 31, 2023

(51) Int. Cl.
*G06Q 30/0241* (2023.01)

(52) U.S. Cl.
CPC ..... *G06Q 30/0276* (2013.01); *G06Q 30/0277* (2013.01)

(58) Field of Classification Search
None
See application file for complete search history.

(56) References Cited

U.S. PATENT DOCUMENTS

| | | |
|---|---|---|
| 5,852,672 A | 12/1998 | Lu |
| 6,134,564 A | 10/2000 | Listou |
| 6,795,113 B1 | 9/2004 | Jackson et al. |
| 6,965,324 B1 | 11/2005 | Suggs, Sr. |
| 7,106,348 B2 | 9/2006 | Matsumoto et al. |
| 7,149,367 B2 | 12/2006 | Cutler |
| 7,567,274 B2 | 7/2009 | Ekpar |
| 7,882,258 B1 | 2/2011 | Sumler et al. |
| 8,353,406 B2 | 1/2013 | Sumler et al. |
| 8,503,826 B2 | 8/2013 | Klimenko |
| 8,913,847 B2 | 12/2014 | Tang et al. |
| 9,443,153 B1 | 9/2016 | Gupta et al. |
| 9,619,104 B2 | 4/2017 | Xin et al. |

(Continued)

FOREIGN PATENT DOCUMENTS

| | | |
|---|---|---|
| KR | 20190060817 A | 6/2019 |
| WO | 2000062542 A1 | 10/2000 |
| WO | 2001903199 A1 | 12/2001 |

OTHER PUBLICATIONS

BinYan et al., "Object detection and robotic sorting system in complex industrial environment," 2017 Chinese Automation Congress (CAC), Jinan, China, 2017, pp. 7277-7281 (Year: 2017).*

(Continued)

*Primary Examiner* — Christopher B Tokarczyk
(74) *Attorney, Agent, or Firm* — Brett J. Trout

(57) ABSTRACT

The present disclosure is directed to automatically receiving, modifying, sequencing, and displaying vehicle images for marketing to prospective buyers. A seller uploads images of a vehicle to the system, which system uses artificial intelligence and machine learning to classify the images, identify objects within the images, add backgrounds, banners, and hotspots, and generate metadata associating the results of the foregoing processes with the particular images. The system uses the stored metadata to sequence the images in a format predetermined by the seller and upload the sequenced images for display to a prospective buyer.

20 Claims, 16 Drawing Sheets

(56) References Cited

U.S. PATENT DOCUMENTS

| | | | |
|---|---|---|---|
| 9,865,069 | B1 | 1/2018 | Saporta et al. |
| 9,986,154 | B2 | 5/2018 | Chen et al. |
| 9,998,663 | B1* | 6/2018 | François .............. H04N 23/683 |
| 10,078,892 | B1 | 9/2018 | Wang et al. |
| 10,140,553 | B1 | 11/2018 | Vasisht et al. |
| 10,332,295 | B1 | 6/2019 | Saporta et al. |
| 10,672,106 | B1 | 6/2020 | Saporta et al. |
| 10,672,169 | B2 | 6/2020 | Saporta et al. |
| 10,719,939 | B2 | 7/2020 | Holzer et al. |
| 10,853,985 | B2 | 12/2020 | Saporta et al. |
| 2002/0018076 | A1 | 2/2002 | Gianola |
| 2002/0063714 | A1 | 5/2002 | Haas et al. |
| 2002/0085219 | A1 | 7/2002 | Ramamoorthy |
| 2003/0030636 | A1 | 2/2003 | Yamaoka |
| 2003/0103065 | A1 | 6/2003 | Masera et al. |
| 2007/0057815 | A1* | 3/2007 | Foy ...................... H04N 5/2627 340/905 |
| 2009/0083815 | A1* | 3/2009 | McMaster .......... H04N 21/8586 725/110 |
| 2009/0112687 | A1 | 4/2009 | Blair et al. |
| 2012/0041722 | A1 | 2/2012 | Quan et al. |
| 2012/0293632 | A1 | 11/2012 | Yukich |
| 2013/0016181 | A1 | 1/2013 | Penner |
| 2013/0243351 | A1 | 9/2013 | Feng et al. |
| 2014/0010412 | A1 | 1/2014 | Price |
| 2014/0035947 | A1 | 2/2014 | Kramer et al. |
| 2014/0132594 | A1 | 5/2014 | Gharpure et al. |
| 2014/0152806 | A1 | 6/2014 | Hauk |
| 2014/0254946 | A1* | 9/2014 | Culpepper ............. G06V 20/35 382/224 |
| 2015/0154798 | A1 | 6/2015 | Simpson et al. |
| 2015/0302633 | A1 | 10/2015 | Li et al. |
| 2015/0325038 | A1 | 11/2015 | Baker |
| 2015/0325048 | A1 | 11/2015 | Engle et al. |
| 2018/0012330 | A1 | 1/2018 | Holzer et al. |
| 2018/0260793 | A1 | 9/2018 | Li et al. |
| 2018/0293664 | A1 | 10/2018 | Zhang et al. |

OTHER PUBLICATIONS

Asuka Yagi, Masataka Imura, Yoshiro Kuroda, and Osamu Oshiro; "360-Degree Fog Projection Interactive Display"; SIGGRAPH Asia 2011; Dec. 12-15, 2011; Hong Kong, China; ISBN 978-1-4503-0807-6/11/0012.

Matthew McGinity, Jeffrey Shaw, Volker Kuchelmeister, Ardrian Hardjono, and Dennis Del Favero; "AVIE: A Versatile Multi-User Stereo 360° Interactive VR Theatre"; EDT 2007; Aug. 4, 2007; San Diego, California; ISBN 978-1-59593-669-1/07/0008.

Tina T. Zhou, Tom Gedeon, and Jess S. Jin; "Automatic Generating Detail-on-Demand Hypervideo Using MPEG-7 and SMIL"; MM'05; Nov. 6-11, 2005; Singapore; ISBN 1-59593-044-2/05/0011.

Petre Stroica and Marian Vladescu; "Implementation of an omnidirectional surveillance system based on 360-degree panoramic vision"; Advanced Topics in Optoelectronics, Microelectronics, and Nanotechnologies VI; Proc. of SPIE vol. 8411, 84111Y.

https://www.webrotate360.com/products/webrotate-360-product-viewer/version-history.aspx. Published prior to Nov. 2020.

https://www.dopeless-design.de/dopeless-rotate-jquery-plugin-360-degrees-product-viewer.html. Published prior to Nov. 2020.

https://github.com/pisi/Reel/blob/master/README.markdown. Published prior to Nov. 2020.

https://www.magictoolbox.com/magic360/. Published prior to Nov. 2020.

https://sirv.com/demos/demo-hotspot-on-360-spin/. Published prior to Nov. 2020.

https://www.ajax-zoom.com/. Published prior to Nov. 2020.

http:/www.ajax-zoom.com/examples/example33.php. Published prior to Nov. 2020.

http://reel360.org/reel. Published prior to Nov. 2020.

https://www.ajax-zoom.com/index.php?cid=docs. Published prior to Nov. 2020.

https://www.webrotate360.com/examples/browse-all-examples/buoyancy-compensator.aspx. Published prior to Nov. 2020.

https://www.webrotate360.com/examples/browse-all-examples/360-car-photography.aspx. Published prior to Nov. 2020.

* cited by examiner

BUMPER
- DOOR HANDLE
- ENGINE
- ENGINE HOOD
- EXHAUST
- FOG LIGHTS
- FRONT HEAD LIGHT
- GAS CAP
- GRILL
- LOGO
- NAVIGATION
- REAR LIGHTS
- REAR SEATS

SHIFTER
- SIDE MIRROR
- SIDE VIEW MIRROR
- STEERING WHEEL
- SUN/MOON ROOF
- TOWING HITCH
- TRUNK
- VENTS
- WHEEL —— 76
- WINDOWS
- WINDSHIELD
- OTHER

ARTIFICIAL INTELLIGENCE MACHINE LEARNING SYSTEM FOR CLASSIFYING IMAGES AND PRODUCING A PREDETERMINED VISUAL OUTPUT

TECHNICAL FIELD

The following disclosure relates generally to a system for classifying, modifying, and sequencing images using a machine-learning artificial intelligence system and, more particularly, to a system for automatically classifying multiple images of a subject using a machine-learning artificial intelligence system for classifying the images, identifying and removing objects within the images, upscaling the resolution, replacing the backgrounds, adding effects, adding overlays, and automatically sequencing the images based upon predetermined criteria, and displaying the images in the new sequence.

BACKGROUND

When selling products, such as vehicles, online, sellers often use photographs to provide potential buyers with additional information to make a better buying decision. Sellers typically provide multiple photographs, both inside and outside the vehicle, posted on a website for potential buyers to search at their leisure. One drawback associated with such prior art websites is the lack of appearance consistency to provide a more professional presentation. Although it would be possible to employ a professional photographer to professionally capture the photographs, then manually edit, sort, and label them, the ephemeral nature of the vehicle inventory typically makes expensive and time-consuming employment of a professional photographer to produce the desired photographs cost ineffective for all but more expensive vehicles. While this solution avoids the necessity for costly professional equipment, the manual processes of identifying the photographs, determining the subject angle identified in each photograph, and discarding superfluous photographs is time-consuming and requires human expertise in the field of digital photographic manipulation.

Alternatively, sellers can use their own cameras to take photographs of the vehicles. While this may be faster and cheaper, the inconsistency of images, angles, lighting, and background of the resulting photographs is less desirable than professional results. However, consistent capture requires the vehicles be moved to the location with the desired background. Moreover, without a dedicated photography studio it can be difficult to capture images consistently. For many sellers, the advantages of consistent vehicle images is outweighed by the time and expense needed to capture such images either professionally or nonprofessionally. It would be desirable to provide a quick, cost-effective way to produce multiple consistent images of vehicles.

While it is known in the art to replace backgrounds and relocate foregrounds in images, this it typically a costly and/or time-consuming process. Varied backgrounds and inconsistently located foreground in images typically require manual manipulation to achieve consistent results. Attempts to automate the process have been costly and/or have met with varying degrees of success. For sets of images that need to be standardized, it would therefore be desirable to obtain the quality of manual background replacement and foreground relocation, with the time and cost savings of automation.

Another drawback of the prior art is the necessity for costly and time consuming manual intervention in sorting, labelling, sequencing, and posting the images online. Adding interactivity to the images, via hotlinks or otherwise, adds an additional level of cost and complexity to displaying the photographs. While prior art systems are available to automate some of these procedures, others require a more detailed analysis more accurately handled manually. It would be desirable to provide a quick, automated, cost-effective system for sorting, labelling, sequencing, and posting the images online.

The present invention improves upon prior art image capture and display systems by employing a system and method that processes photographs of different angles of different vehicles, automatically detects the angles shown in the photographs using machine learning & artificial intelligence, automatically sorts, classifies, and labels the photographs, sequences the photographs, standardizes the location of the vehicles within the photographs, adds a consistent background, and displays the photographs in a consistent manner. The system may be employed to automatically crop, scale, and upscale the images, add hotspots, and/or alert the seller of missing images.

SUMMARY OF THE DISCLOSED SUBJECT MATTER

The system and method of the present disclosure is directed to generating a predetermined display of images of a vehicle using a provided plurality of photographs. The system and method uses artificial intelligence machine learning technologies to receive images, automatically analyze them and automatically classify them, adding metadata to the images associated with the analysis and classification. The system and method also uses artificial intelligence machine learning technologies to scale and upscale the image of the vehicle within the images, identify objects within the image, associate hotspots with the objects, add consistent backgrounds, relocate foregrounds, and use the metadata to sequence the resulting modified images for display in a user-selected manner.

At least one aspect of the present disclosure is directed to using artificial intelligence and machine learning to identify missing images and/or create new images by cropping and scaling the original images.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 7 is a list of objects to be identified by machine learning and artificial intelligence in captured images of a subject, in accordance with one or more aspects of the present disclosure.

DESCRIPTION OF EMBODIMENTS

Figure 1:
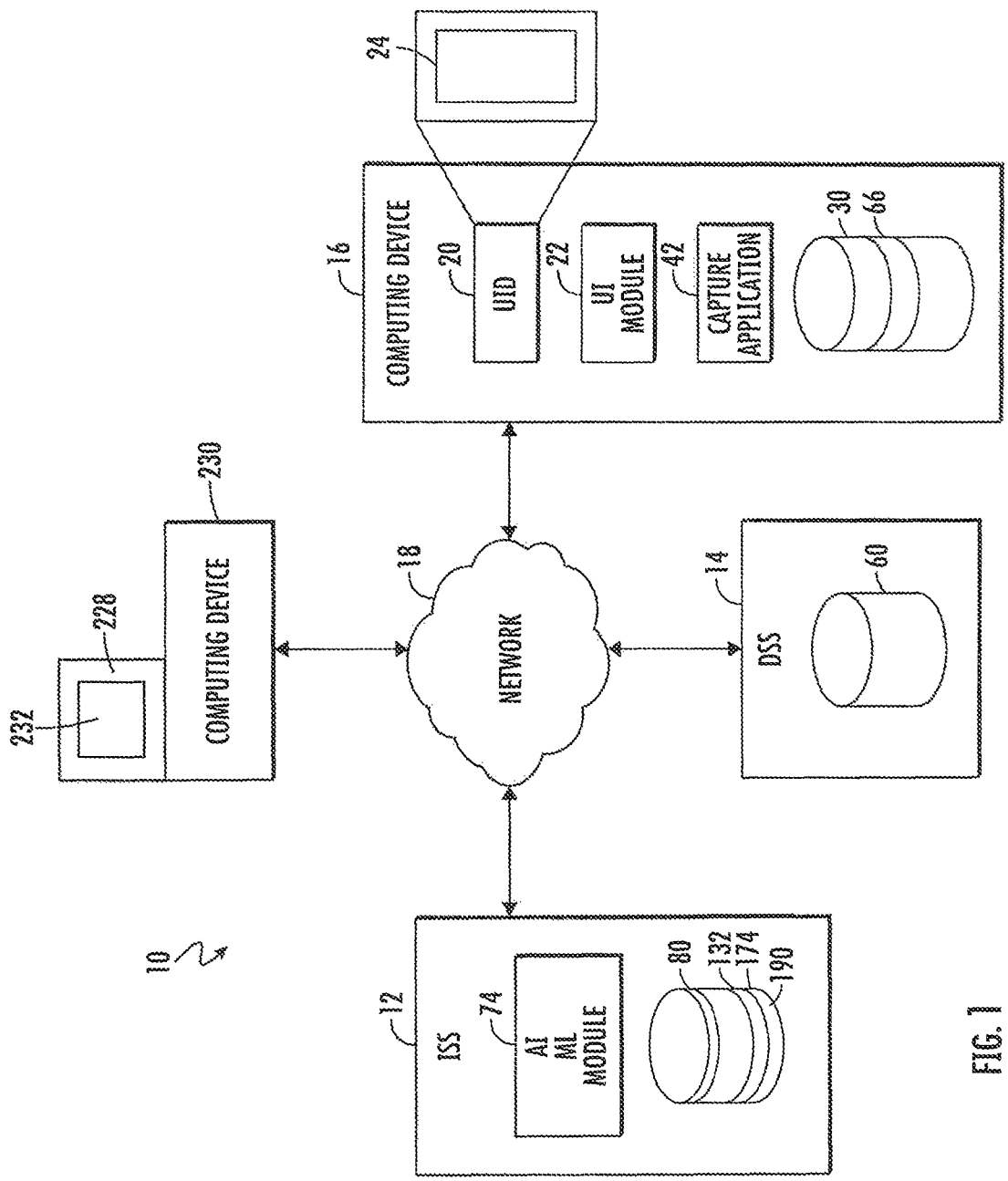
FIG. 1 is a conceptual diagram illustrating an example computing device for classifying, modifying, sequencing, and displaying groups of images, in accordance with one or more aspects of the present disclosure.

In general, techniques of this disclosure and the system described herein enable a seller to take photographs of a subject, such as a vehicle, standardize these photographs, and display them to potential buyers. The system uses a computing device to automatically access a plurality of vehicle images and, using seller-selected criteria, artificial intelligence, and machine learning, automatically classify, analyze, and modify the images, adding metadata to the images reflecting the processes performed. The system uses the metadata to sequence and display the modified images on a sales webpage in accordance with seller-selected criteria.

More particularly, a computer system, such as those known in the art, executes instructions stored on a computer-readable storage medium to analyze contextual information within with the images to: classify the images, identify objects within the images, add hotspots to the images, crop and add a background to the images, upscale and add overlays to the images, and sequence and display the images for examination by potential buyers. If the subject is a vehicle, the classifications may include the type of vehicle, the portion of the vehicle shown in the photograph, etc., while the objects may include objects in the image, such as a license plate, a mirror, a sticker, a sunroof, etc.

For example, a seller may walk around a vehicle, taking pictures and/or videos of the vehicle from various angles with the seller's mobile device. The seller then uploads the images over the internet to a computer having software installed that automatically uses artificial intelligence machine learning to analyze and annotate the images with metadata reflecting the results of the analysis. The system automatically uses this metadata to sequence the modified images in accordance with the seller-selected criteria and upload the predetermined sequence of images for display on a sales webpage.

The system may perform other modifications of the images, such as using artificial intelligence machine learning to relocate the vehicle image within the image, add shadows and new backgrounds, upscale the vehicle image, and add overlays to the images. For each of these operations the system also annotates the image with metadata associated with the respective operation.

The artificial intelligence aspect of the system improves the identification accuracy and processing time by generating a classification function and an object identification function using specific training data sets. If desired, the object identification function may be a convolutional neural network (CNN). The classification function is determined based on a first group of images, categorized and labeled into at least two groups of images, one of which is used to generate the object identification function for the images selected for display.

By facilitating management of computing resources, this division of classification and object functions improves the identification system. The machine-learning artificial intelligence system may also improve the accuracy of detection by generating a training data set with a high relevance. To overcome lack of uniformity from images received for identification, the training data sets used by the identification system may include images that are modified to account for variations from images taken with mobile devices. The identification system may also be automatically updated as new images become available, vehicle information changes, and/or a web scraper used to collect new images available from online resources. As information in online resources changes, the identification system may recalculate the classification and object identification functions to improve results.

A novel aspect of the artificial intelligence machine learning component of the system examines the images against the list of classifications to find images for display. The list may include such classifications as images showing: the driver side of the vehicle, the passenger side of the vehicle, the front of the vehicle, and the rear of the vehicle. The system then automatically assigns metadata values to the classified images and uses the metadata to automatically sequence the images and display them to a potential buyer. The system thereby generates a consistent sales presentation through standardization of the images by centering the vehicles in the images, adding a consistent background, associating hotspots and hotspot data files with identified objects, sharpening the images, placing the images in a standardized sequence for display, and even cropping and sharpening portions of available images to generate missing images. As the system examines images associated with the subject, the machine learning component of the system continuously updates itself to better classify the images and objects. The system also issues an alert identifying any images that are missing from the classification list and that cannot be automatically generated by the system.

The system may also be provided with data associated with various objects, such as features, of the vehicles. For example, the artificial intelligence machine learning component of the system scans the images to identify and locate objects within the images. As used in this context, artificial intelligence machine learning refers to computer-aided supervised learning that uses complex mathematical formalisms to make inference-based assumptions to improve the accuracy of the mapping of inputs to outputs using one or more general rules. The system automatically associates hotspots and the associated hotspot data files with predetermined objects in the images. The hotspot image data files contain data associated with the object, and may contain text, audio, or videos. When a user uses a media player to view an image and selects the hotspot in the image, the system provides the user with the associated data, by presenting a text window, launching a video, playing audio, etc. As the system examines images associated with the vehicle, the machine learning component of the system may continuously update itself to better locate objects in the images to add hotspots.

The system may also examine the images to differentiate the subject in the images from the background. The machine learning component continuously updates itself to better separate the vehicles in the images from the backgrounds. Once the vehicle has been differentiated from the background in the images, the system automatically separates the vehicle from the background in the images to create a modified, standardized image for display. The system may leave the background blank, may automatically insert a solid color background, may add banners, or may insert a detailed background such as a rustic or urban landscape.

Throughout the disclosure, examples are described where a computing device and/or a computing system analyzes images associated with a subject to automatically classify subjects and identify objects in the images, adds metadata to the images reflecting these classifications and identifications, and uses this metadata to standardize and display the modified images. Once the modified images are displayed, the user may access images through a known media player to see standardized views of the vehicles and select hotspots associated with various objects of the vehicle to learn more about various features of the vehicles an obtain purchase information.

Exemplary Systems

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first image could be termed a second image, and, similarly, a second image could be termed a first image, without departing from the scope of the present invention. The first image and the second image are both images, but they are not the same image.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated objects, integers, steps, operations, elements, and/or components, but do not preclude the presence or addition of one or more other objects, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as application and other smart phone functions. Exemplary embodiments of portable multifunction devices include, without limitation, the iPhone®, and iPad® devices from Apple Inc. of Cupertino, Calif. Other portable electronic devices, such as laptops or tablet computers with touch-sensitive surfaces (e.g., touch screen displays and/or touch pads) may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, stylus, a mouse and/or a joystick.

The device typically supports a variety of applications, such as one or more of the following: a telephone application, an e-mail application, an instant messaging application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of the system and method for automatically analyzing, modifying, sequencing, and displaying images. FIG. 1 is a conceptual diagram illustrating system 10 as an example system for automatically examining and classifying images and combining the images into a spin of the subject, in accordance with one or more aspects of the present disclosure. System 10 includes information server system ("ISS") 12 in communication, via network 18, with dealer server system ("DSS") 14 and computing device 16. Although system 10 is shown as being distributed amongst ISS 12, DSS 14, and computing device 16, in other examples, the objects and techniques attributed to system 10 may be performed internally by a computer-readable storage medium having computer-executable instructions stored thereon which, when executed by a computer, cause the computer to perform the processes described below. Such a computer-readable storage medium can be found in a standard computing device known in the art, such as local components of computing device 16. Similarly, ISS 12 may include certain components and perform various techniques that are otherwise attributed in the below description to DSS 14 and computing device 16.

Network 18 represents any public or private communications network, for instance, cellular, Wi-Fi, and/or other types of networks, for transmitting data between computing systems, servers, and computing devices. ISS 12 may communicate, via network 18, with computing device 16 to receive images from the computing device 16. Similarly, ISS 12 may communicate, via network 18, with DSS 14 to receive data associated with subjects (such as vehicles) depicted in images received from computing device 16.

Network 18 may include one or more network hubs, network switches, network routers, or any other network equipment, that are operatively inter-coupled thereby providing for the exchange of information between ISS 12, DSS 14, and computing device 16. Computing device 16, ISS 12, and DSS 14 may transmit and receive data across network 18 using any suitable communication techniques. ISS 12, DSS 14, and computing device 16 may each be operatively coupled to network 18 using respective network links. The links coupling computing device 16, ISS 12, and DSS 14 to network 18 may be Ethernet or other types of network connections and such connections may be wireless and/or wired connections.

Computing device 16 represents an individual mobile or non-mobile computing device. Examples of computing device 16 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or home assistant), a personal digital assistants (PDA), a portable gaming system, media player, e-book reader, mobile television platform, automobile navigation and entertainment system, or any other types of mobile, non-mobile, wearable, and non-wearable computing devices configured to receive information via a network, such as network 18.

Computing device 16 includes user interface device (UID) 20 and user interface (UI) module 22. Module 22 may perform operations described using software, hardware, firmware, or a mixture of hardware, software, and firmware residing in and/or executing at respective computing device 16. Computing device 16 may execute module 22 with multiple processors or multiple devices. Computing device 16 may execute module 22 as virtual machines executing on underlying hardware. Module 22 may execute as one or more services of an operating system or computing platform. Module 22 may execute as one or more executable programs at an application layer of a computing platform.

UID 20 of computing device 16 may function as an input and/or output device for computing device 16. UID 20 may be implemented using various technologies. For instance, UID 20 may function as an input device using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. In addition, UID 20 may include microphone technologies, infrared sensor technologies, or other input device technology for use in receiving user input.

UID 20 may function as output (e.g., display) device using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 16. In addition, UID 20 may include speaker technologies, haptic feedback technologies, or other output device technology for use in outputting information to a user.

UID 20 may include a presence-sensitive display that may receive tactile input from a user of computing device 16.

UID 20 may receive indications of tactile input by detecting one or more gestures from a user (e.g., the user touching or pointing to one or more locations of UID 20 with a finger or a stylus pen). UID 20 may present output to a user, for instance at a presence-sensitive display. UID 20 may present the output as a graphical user interface (e.g., user interface 24), which may be associated with functionality provided by computing device 16 and/or a service being accessed by computing device 16.

For example, UID 20 may present a user interface (e.g., user interface 24) related to uploading images to ISS 12 which UI module 22 accesses from ISS 12 on behalf of computing device 16. In some examples, UID 20 may present a user interface related to image collection and distribution functions provided by UI module 22 or other objects of computing platforms, operating systems, applications, and/or services executing at or accessible from computing device 16 (e.g., electronic message applications, Internet browser applications, mobile or desktop operating systems, etc.).

UI module 22 may manage user interactions with UID 20 and other components of computing device 16 including interacting with ISS 12 so as to provide spin generation results at UID 20. UI module 22 may cause UID 20 to output a user interface, such as user interface 24 (or other example user interfaces) for display, as a user of computing device 16 views output and/or provides input at UID 20. UI module 22 and UID 20 may interpret inputs detected at UID 20 and may relay information about the inputs detected at UID 20 to one or more associated platforms, operating systems, applications, and/or services executing at computing device 16, for example, to cause computing device 16 to perform functions.

UI module 22 may receive information and instructions from one or more associated platforms, operating systems, applications, and/or services executing at computing device 16 and/or one or more remote computing systems, such as ISS 12 and DSS 14. In addition, UI module 22 may act as an intermediary between the one or more associated platforms, operating systems, applications, and/or services executing at computing device 16, and various output devices of computing device 16 (e.g., speakers, LED indicators, audio or electrostatic haptic output device, etc.) to produce output (e.g., a graphic, a flash of light, a sound, a haptic response, etc.) with computing device 16.

In the example of FIG. 1, user interface 24 is a graphical user interface associated with a customer assistance service provided by ISS 12 and accessed by computing device 16. As shown in FIG. 1, user interface 24 presents "image capture" from ISS 12 to aid a user in capturing images for display. User interface 24 may present product information in various forms such as text, graphics, content cards, images, etc. UI module 22 may cause UID 20 to output user interface 24 based on data UI module 22 receives via network 18 from ISS 12. UI module 22 may receive graphical information (e.g., text data, images data, etc.) for presenting user interface 24 as input from ISS 12 along with instructions from ISS 12 for presenting the graphical information within user interface 24 at UID 20.

Figure 2:
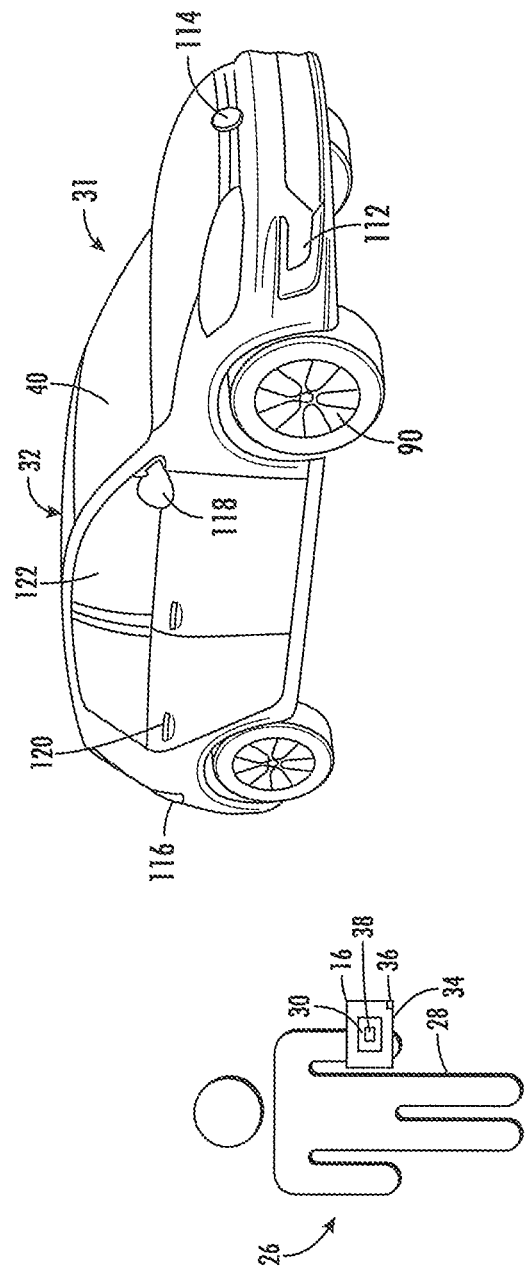
FIG. 2 is a perspective view of a user capturing subject images and/or videos, in accordance with one or more aspects of the present disclosure.
Figure 3:
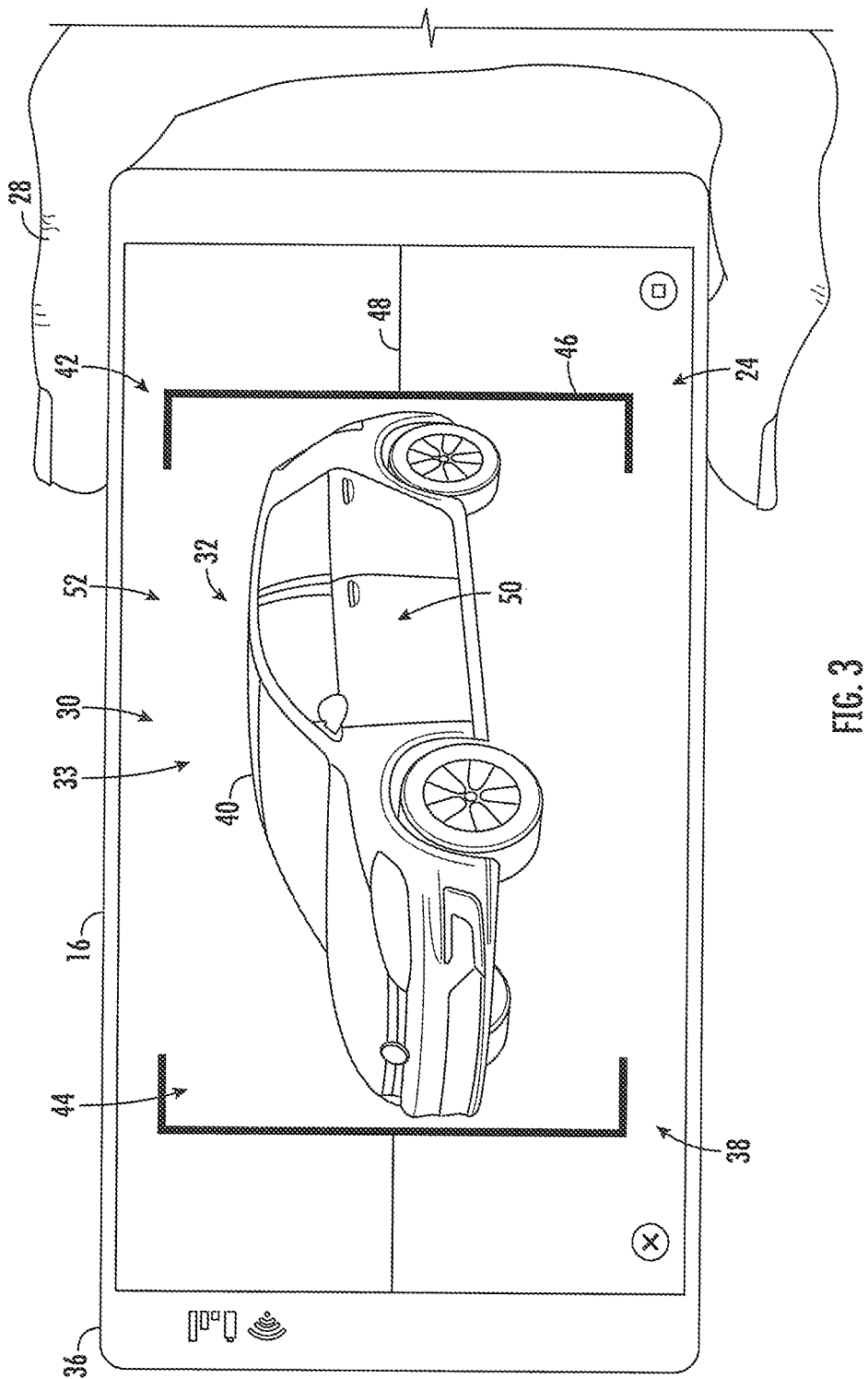
FIG. 3 is a conceptual diagram illustrating an example graphical user interface presented by an example computing system that is configured to capture subject images at a physical location, in accordance with one or more aspects of the present disclosure.

FIG. 2 is a perspective view of a user 26, in this embodiment a seller, namely a vehicle dealer 28, using computing device 16 to capture a plurality of images 30 of at a first item, preferably a first vehicle 31, with multiple images being taken of several different rotational orientations i.e. (rear, driver side, ¾ driver side, front, passenger side, etc.) of the vehicle 31. The vehicle dealer 28 also captures multiple images 30 of multiple rotational orientations of other vehicles 33 as well. (FIGS. 1-3). An item 32 may be any good or service the user 26 has for sale. In this embodiment, computing device 16 is a mobile phone 34 having a camera 36 and display 38, and the item 32 is a vehicle 40. When dealer 28 wishes to use system 10 to display images 30 of vehicle 40, dealer 28 launches a downloaded application 42 running locally on computing device 16. FIGS. 1-3. The application 42 prompts the dealer 28 to input predetermined instructions for various functions of the system 12.

For example, the application 42 prompts the dealer 28 to create a file 80 containing different predetermined lists (not shown) of objects 76 the dealer 28 wants the system to identify in the images 30 of various vehicles 40, whether the dealer 28 wants to associate hotspots with various object, and where the files associated with the hotspots are located. The dealer 28 can upload a file containing the predetermined list of objects to the system 12, create a list via prompts on the application, select a predetermined list offered through the application 42, or by any other manner known in the art. Similarly, the application 42 prompts the dealer 28 to create a file 132 containing a list 134 of classifications 136 the dealer 28 would like the system 12 to classify the images 30 of various vehicles 40 into. For instance, the dealer 28 may instruct the system to classify the images 30 into front vehicle view, passenger vehicle view, and ¾ front driver view. The application 42 also prompts the dealer 28 to select a preferred display sequence indicating the order in which the system 10 is to display the images 30, preferably based on classifications of the images 30 identified by the system 10. The dealer 28 may choose to have a large image of the ¾ front driver view of each vehicle displayed above a smaller image of the front vehicle view on the left and a smaller image of the passenger vehicle view on the right. The application 42 may also prompt dealer 28 for preferences regarding removing objects, such as license plates, from images 30, adding new backgrounds to images 30, adding shadows, sharpening images 30, adding overlays, relocating the images of the vehicles 40 within the images 30, etc. Alternatively, the dealer 28 can use the application 42 to select one or more default settings to classify, modify, sequence, and display the images 30.

As shown in FIG. 3, when dealer 28 launches application 42, display 38 of computing device 16 displays an image capture screen 44. As shown in FIG. 3, when dealer 28 focuses computing device 16 to capture an image 30, system 12 presents the user interface 24 on display 38 associated with computing device 16.

User interface 24 provides multiple aids to assist dealer 28 in optimizing image capture to facilitate system 10 modifying, sequencing, and displaying images 30. (FIGS. 1-3). Two such aids are target brackets 46 and level lines 48 that indicate to dealer 22 where to position vehicle 40 on display 38 to facilitate system 16 being able to classify, analyze, annotate, and sequence images 30 for display. When dealer 22 aims computing device 16 at vehicle 34, user interface 24 associated with system 10 displays target brackets 46 and level lines 48. Dealer 28 adjusts camera 36 of computing device 16 until item 32 appears on display 38 between the target brackets 46. Dealer 28 then adjusts camera 36 until level lines 48 are generally collinear with a centerline 50 defined by vehicle 40 and captures a first image 52 of vehicle 40 showing at least an identifiable portion of vehicle 40. FIGS. 1, 3, and 4A-B. To capture a second image 54, dealer 28 moves to a different location, points camera 36 toward vehicle 40 and captures a second image 54 in a manner such as that described above. Dealer 28 repeats this process, moving around vehicle 40 capturing images 30 from different angles until dealer 28 has completely circled vehicle 40. Alternatively, especially when it is desired to capture images of smaller subjects, instead of circling vehicle 40, dealer 28 may, instead, choose to place vehicle 40 or other item 32 on a rotating base (not shown). If a rotating base is used, dealer 28 may remain in place and capture images 30 of vehicle 40 until vehicle 40 has made a complete revolution. Preferably, whatever method is used, dealer 28 captures images 30 completely around vehicle 40.

Figure 5:
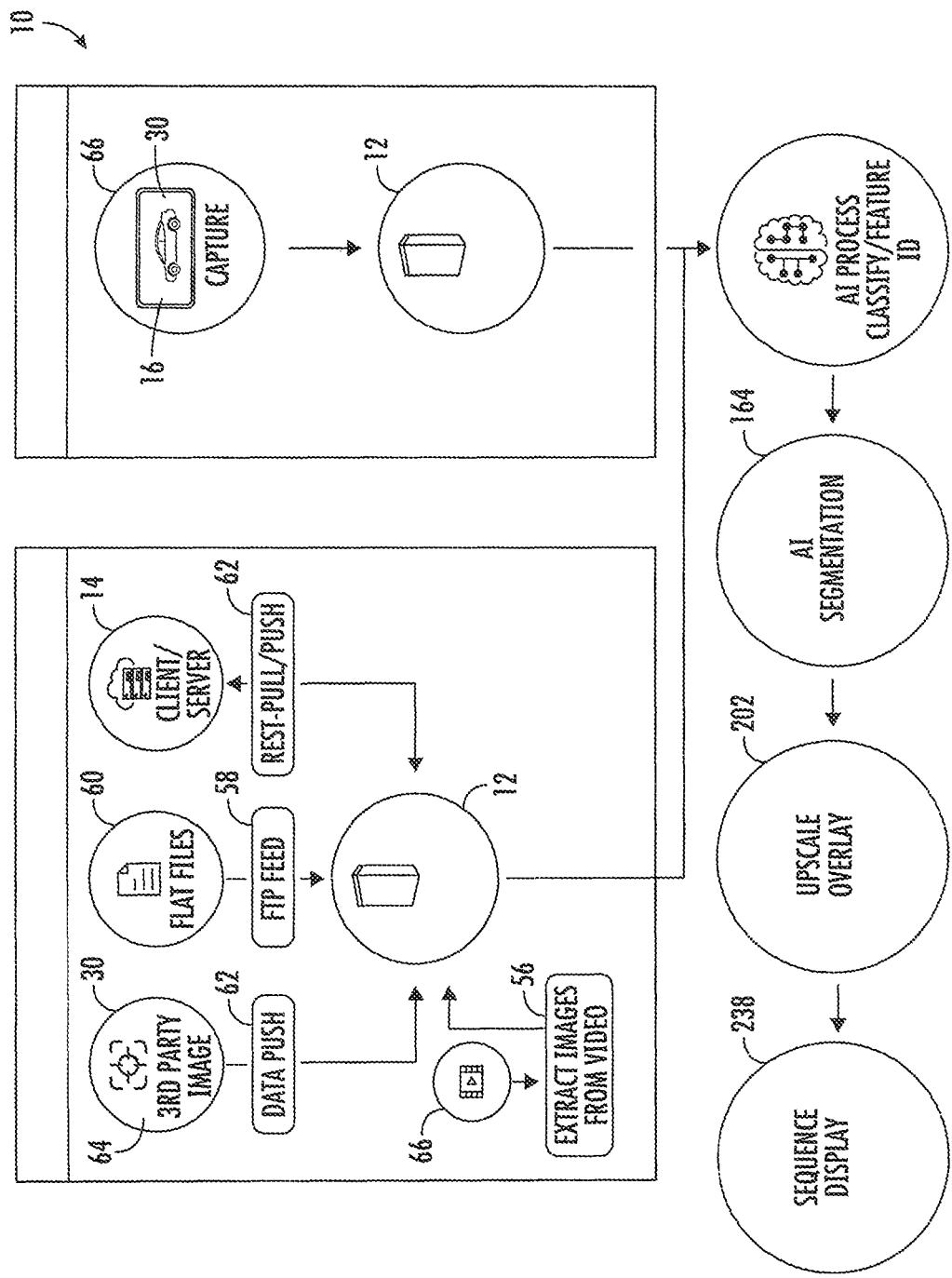
FIG. 5 is a flowchart illustrating example operations performed by an example computing system that is configured to capture, classify, segment, overlay, sequence and display images, in accordance with one or more aspects of the present disclosure.

As shown in FIG. 5, once images 30 of item 32 have been captured, system 10 automatically transfers data from computing device 16 to ISS 12. This data comprises at least one image from the plurality of images 30. Preferably the system 10 automatically transfers supplemental data from computing device 16 to ISS 12 containing all of the remaining desired images 30. Alternatively, as shown in FIG. 5, dealer 28 may manually upload images 30 from computing device 16 to ISS 12. As another alternative, dealer 28 may upload images 30 from computing device 16 to DSS 14, which, in turn, uploads images 30 to ISS 12.

Instead of captured still images, images 30 may instead be still images automatically extracted 56 by system 10 from standard video files 66. ISS 12 may also receive data relating to images 30 via FTP feed 58 from a flat files database 60 or from DSS 14, using representational state transfer (REST) pull/push 62 or similar architecture. This additional data may relate to vehicle 40 shown in images 30, such as make, model, year, damage, or objects in the images 30. In alternative embodiment, user 26 can upload $3^{rd}$ party images 64 and upload them to ISS 12.

Figure 6:
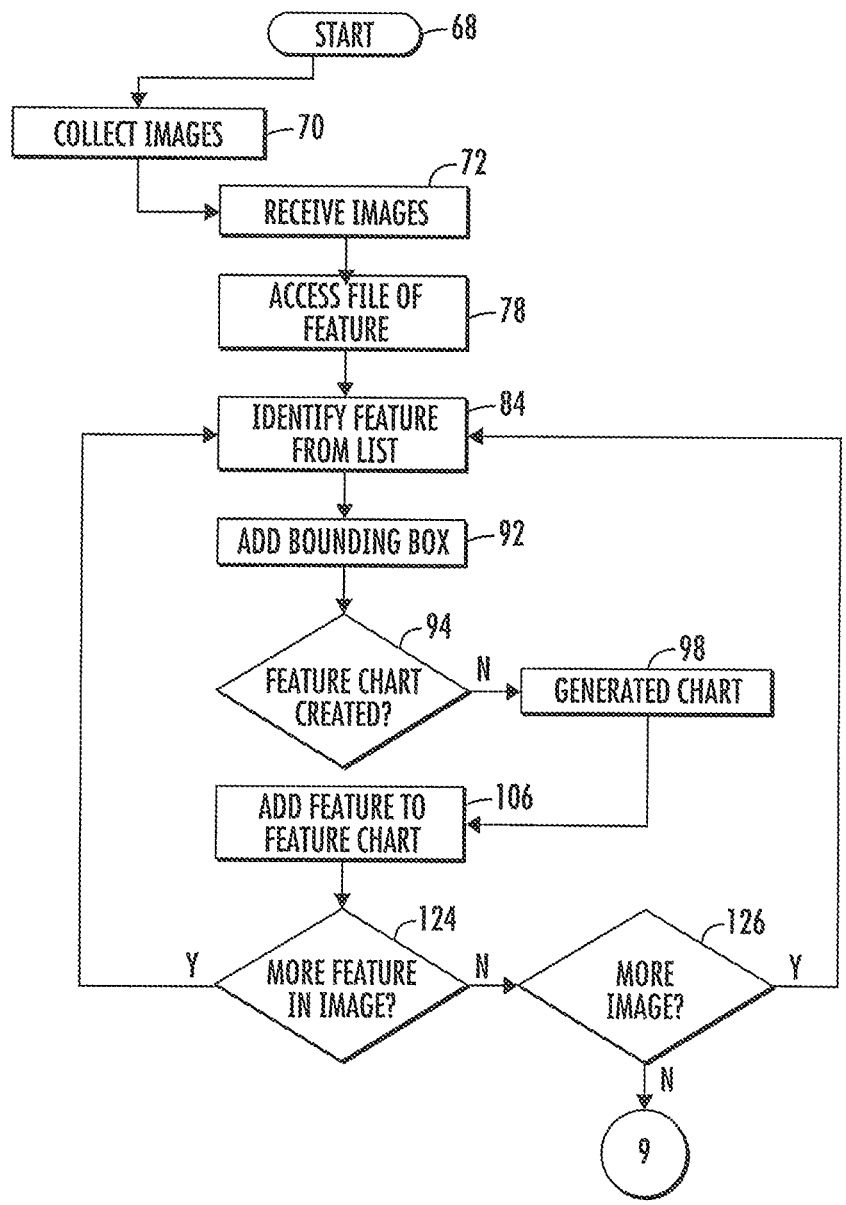
FIG. 6 is a flowchart illustrating example machine learning and artificial intelligence object identification operations performed by an example computing system, in accordance with one or more aspects of the present disclosure.

As shown in FIG. 6, the process for modifying and sequencing the images 30 for display using system 10 is preferably completely automated, starting 68 with dealer 28 collecting 70 images 30, ISS 12 receiving 72 those images 30. (FIGS. 1-2, 5-6). Upon receipt of images 30, system 10 uses artificial intelligence machine learning "AI/ML" module 74 to automatically analyze features, as objects 76 for identification in images 30. The objects may be any features of the item located in the image 30, such as wheels 90, bumpers 112, logos 114, rear lights 116, side mirrors 118, door handle 120, windows 122, etc. AI/ML module 74 accesses 78 ISS 12 to retrieve a file 80 containing a list 82 of objects 76 of vehicles 40 to be identified in images 30. In addition to list 82, ISS 12 may store numerous files 80 containing different predetermined lists (not shown) of objects 76 to be identified in images 30 of various vehicles 40 and other items 32 as desired. (FIG. 1, 4-7).

AI/ML module 74 uses contextual image classification and machine learning to identify patterns in first image 52 based on contextual information in image 52, such as the groupings of pixels surrounding a target pixel. (FIGS. 1, 4-7). AI/ML module 74 compares contextual information derived from first image 52 against objects 76 in list 82 to identify 84 targets 86 and surrounds targets 86 with bounding boxes 88 in a manner such as those known in the art. For example, as shown in FIGS. 1-2, 4A-B, 6, and 7, AI/ML module 74 receives 72 images 30 from dealer 28, accesses 78 list 82 of objects 76 from ISS 12, identifies 84 a target 86 in first image 52 as an object 76 of vehicle 40 on list 80, such as wheel 90, and adds 92 a bounding box 88 around the target 86. Once an object, such as object 76, has been identified in first image 52, AI/ML module 74 determines 94 whether an object chart 96 has been generated and, if not, generates 98 an object chart 96 such as that shown in FIG. 8.

Figure 4A:
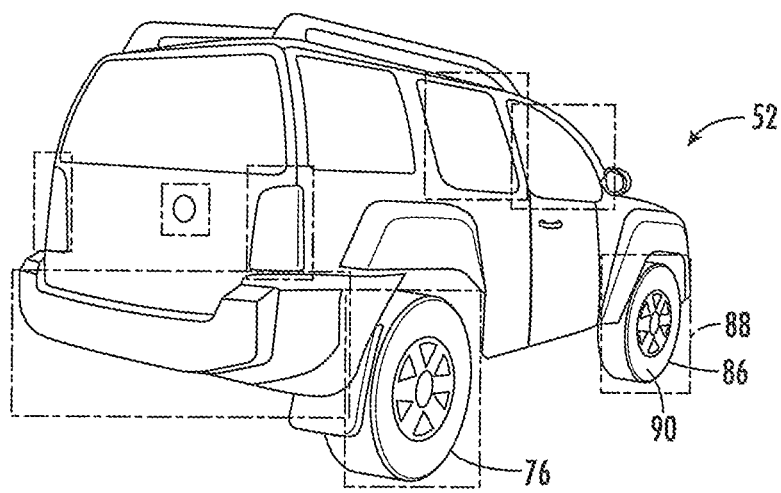
FIG. 4A is a captured image of a three-quarter rear passenger side view of a vehicle and provided with boundary boxes identified by machine learning and artificial intelligence, in accordance with one or more aspects of the present disclosure.
Figure 4B:
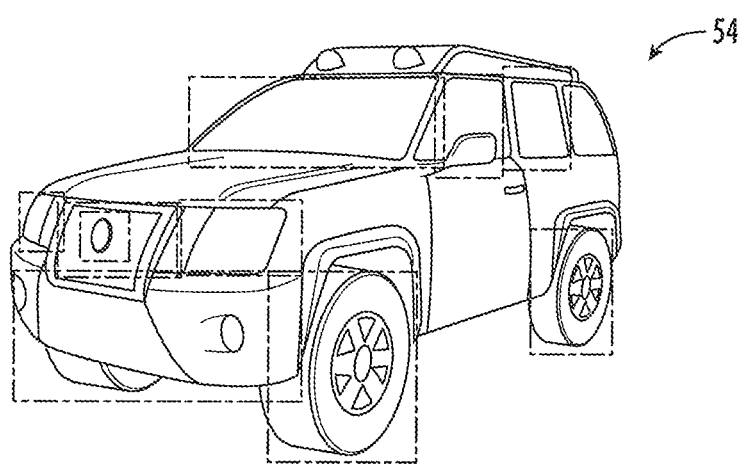
FIG. 4B is a captured image of a three-quarter front driver side view of a vehicle and provided with boundary boxes around objects identified by machine learning and artificial intelligence, in accordance with one or more aspects of the present disclosure.
Figure 8:
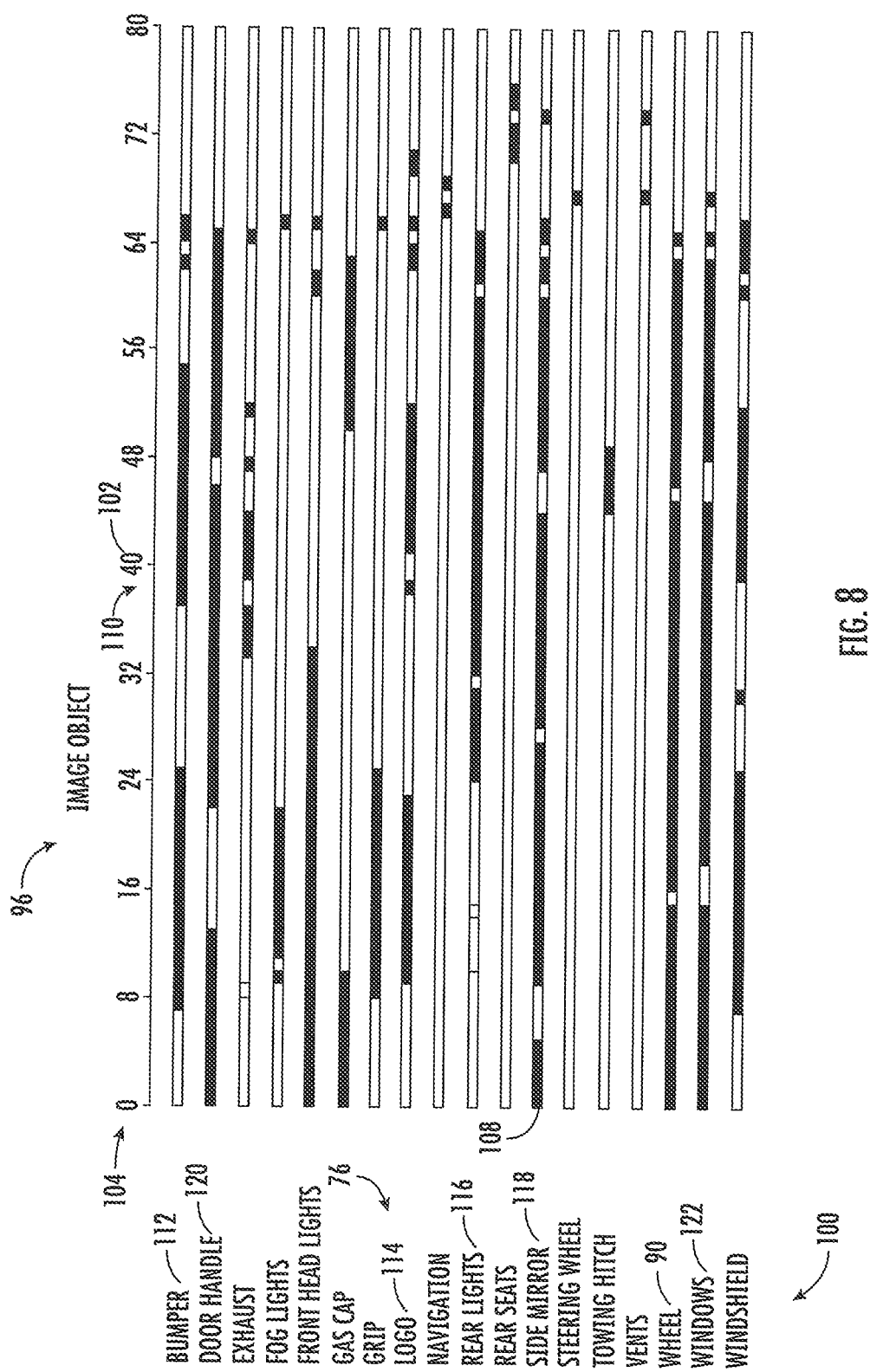
FIG. 8 is an image object chart identifying objects detected in captured images by machine learning and artificial intelligence, in accordance with one or more aspects of the present disclosure.

Object chart 96 lists objects 76 AI/ML module 74 finds in images 30, listing objects 76 along a y-axis 100 and image numbers 102 along an x-axis 104. Once object chart 96 has been generated 98, as AI/ML module 74 identifies 84 objects in first image 52, the module 74 adds 106 those objects 76 to object chart 96 by darkening all lines 108 in object chart 96 corresponding to the identified object along y-axis 100 and a unique number 110 associated with images 30 along x-axis 104. While unique number 110 is preferably a number identifying the sequential order in which the associated image 30 was captured, unique number may instead be randomly selected or otherwise assigned as desired. For example, as shown in FIGS. 4A and 8, if first image 52 is associated with unique number "39," AI/ML module 74 would identify objects 76 including wheel 90, bumper 112, logo 114, rear lights 116, side mirror 118, door handle 120, and windows 122 and darkens all portions of lines 108 in object chart 96 corresponding to those objects 76 under image number "39."

After adding an identified object to object chart 96, AI/ML module 74 determines whether the identified object is on a list provided, or at least authorized, by dealer 28 of items to be removed from images. If the object is on the removal list, such as a license plate or a window sticker, AI/ML module 74 removes the object from the image, replacing the image with a solid color block, a predetermined image, such as a dealer logo, or another predetermined replacement. Alternatively, for items to be removed from windows etc, AI/ML module 74 uses contextual image classification and machine learning to identify patterns in the image based on contextual information, such as the groupings of pixels surrounding a target pixel to replace the removed object with pixels configured to look like the area surrounding the removed object. In the case of a sticker removed from a window, AI/ML module 74 would remove the sticker and replace it with pixels giving the appearance of a window, so that there is little or no trace of the sticker having been removed from the image.

Figure 9:
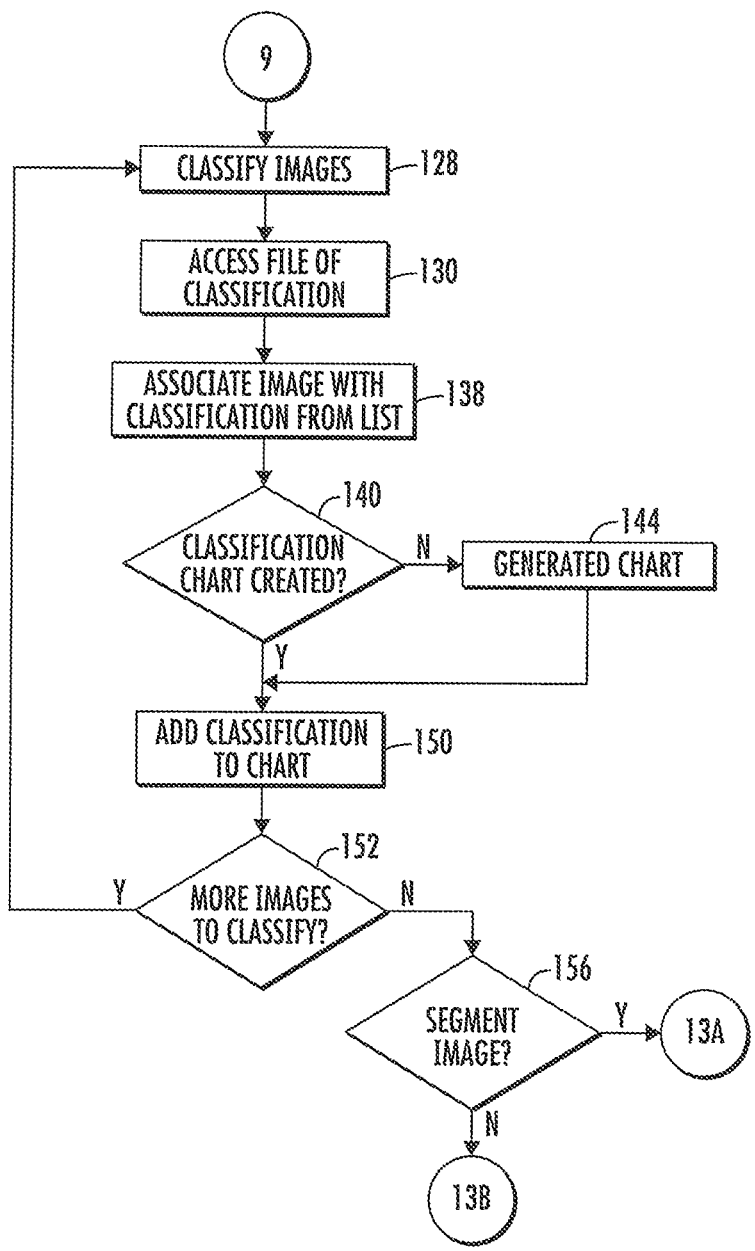
FIG. 9 is a flowchart illustrating example machine learning and artificial intelligence classification operations performed by an example computing system, in accordance with one or more aspects of the present disclosure.

After adding an identified object to object chart 96, AI/ML module 74 adds a metadata value to the associated image file (not shown) associating the first image with the object identification, indicating details about the identified object, such as the type of object, its location, whether it was removed from the image, etc. AI/ML module 74 determines 124 if there are any more unidentified objects 76 in first image 52 and, if so, returns to step 84. The system 10 continues until AI/ML module 74 determines 124 there are no more unidentified objects 76 in first image 52, at which point, module 74 determines 126 if there are any more images 30 that have not been analyzed and added to object chart 96. For example, if AI/ML module 74 determines 124 there are no more unidentified objects 76 in first image 52, module 74 returns to step 84 and analyzes second image 54. The system 10 continues in this manner until AI/ML module 74 has identified and added all desired objects 76 in all images 30 to object chart 96, at which point the module 74 classifies 128 images 30. (FIGS. 6, 8-9).

Figure 10:
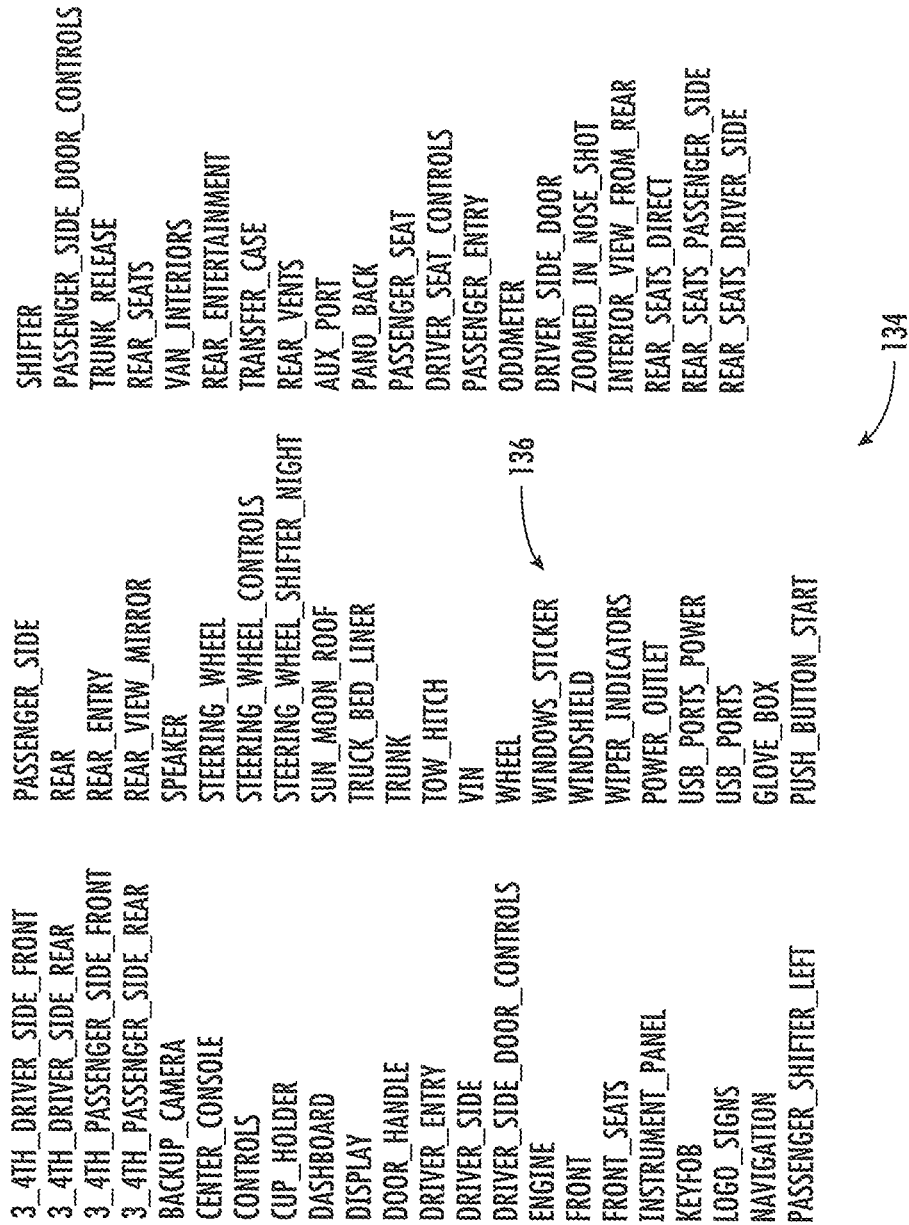
FIG. 10 is a list of classifications to be identified in captured images of an object by machine learning and artificial intelligence, in accordance with one or more aspects of the present disclosure.
Figure 11:
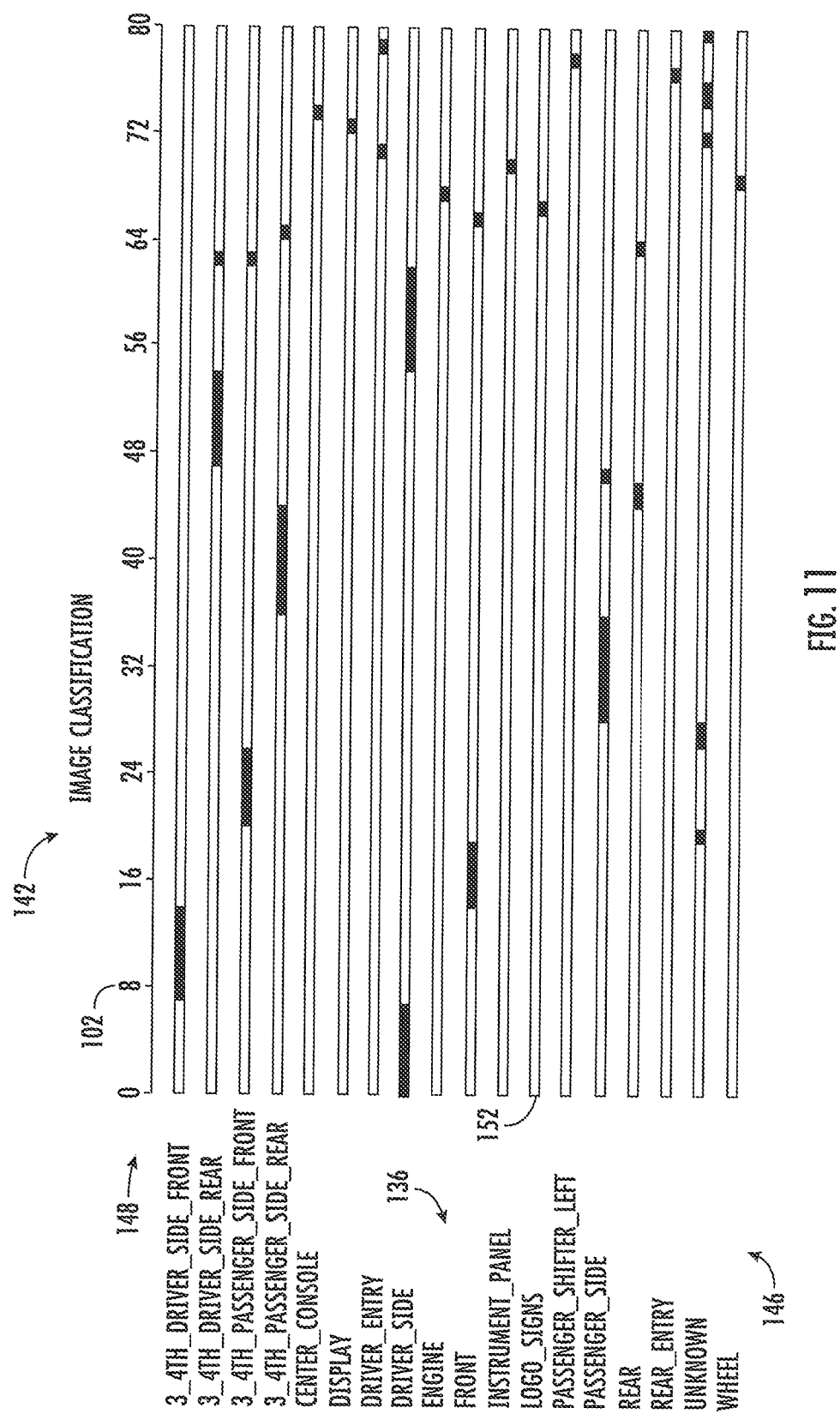
FIG. 11 is an image classification chart classifying images using machine learning and artificial intelligence, in accordance with one or more aspects of the present disclosure.

To classify 128 images 30, AI/ML module 74 accesses 130 ISS 12 to retrieve a file 132 containing a list 134 of classifications 136 of images 30, as predetermined by vehicle dealer 28 or otherwise. (FIGS. 1, 9-10). As shown in FIG. 10, classifications 136 may include descriptions of the image 30, such as what portion of the subject is shown in the image 30 and from what angle. In addition to list 134, ISS 12 may store numerous files 132 containing different predetermined lists 134 of classifications 136 to associate with images 30 of various vehicles 40 and other items 32 as desired.

In an exemplary embodiment, AI/ML module 74 automatically uses previously identified objects 76 in images 30, contextual information, and machine learning to identify patterns in first image 52 to associate 138 first image 52 with a classification 126 selected from the list 134 of classifications 136. For example, AI/ML module 74 may determine, based on previously identified objects 76 in first image 52 that the classification 136 from list 134 most closely matching first image 52 is 3_4th_passenger_side_rear, indicating that first image 52 shows a three-quarters image of vehicle 40 taken from the rear passenger side of vehicle 40. Alternatively, AI/ML module 74 may use contextual image classification and machine learning to identify patterns in first image 52 based on contextual information in image 52, such as the groupings of pixels surrounding a target pixel in a manner such as that described above in relation to identifying 84 targets 86, albeit using target 86 to classify images 30 rather than simply identifying objects 76 within images 30.

Once first image 52 has been associated 138 with a classification 136, AI/ML module 74 determines 140 whether a classification chart 142 has been generated and, if not, generates 144 a classification chart 142 such as that shown in FIG. 10. Classification chart 142 lists classifications 136 that AI/ML module 74 has associated with various images 30, listing classifications 136 along a y-axis 146 and image numbers 102 along an x-axis 148. Once classification chart 142 has been generated 144, as AI/ML module 74 classifies first image 52, the module 74 adds 150 the classification 136 associated with first image 52 to classification chart 142 by darkening all lines 152 in classification chart 142 corresponding to the associated classifications 136 along y-axis 146 and unique numbers 110 associated with images 30 along x-axis 148. As each image 30 is associated 138 with a classification 136, AI/ML module 74 adds a metadata value to the associated image file (not shown) associating the image 30 and the classification, and indicating details about the classification.

For example, as shown in FIGS. 4A-B and 9-11, if first image 52 is associated with the classification 3_4th_passenger_side_rear, AI/ML module 74 would darken a portion of line 152 in classification chart 142 corresponding to classification 3_4th_passenger_side_rear under image number "39." After adding 150 an identified classification to classification chart 142, AI/ML module 74 determines 154 if there are any more images 30 that have not been classified and added to classification chart 142. For example, if AI/ML module 74 determines 154 there are additional images 30 to classify, system 10 returns to step 128 to classify the next image 30.

The system 10 continues in this manner until AI/ML module 74 has classified all desired images 30 and added all desired classifications 136 to classification chart 142, at which point the module 74 determines 156 if items 32 in the images 30, such as the vehicle 40, are to be segmented 164 from backgrounds 160 associated with images 30. (FIGS. 1, 9, 12A-D, 13). If module 74 determines 156 images 30 are to be segmented 164 from backgrounds 158, module 74 begins to segment vehicles 40 within images 30 from their associated backgrounds 158.

Figure 12A:
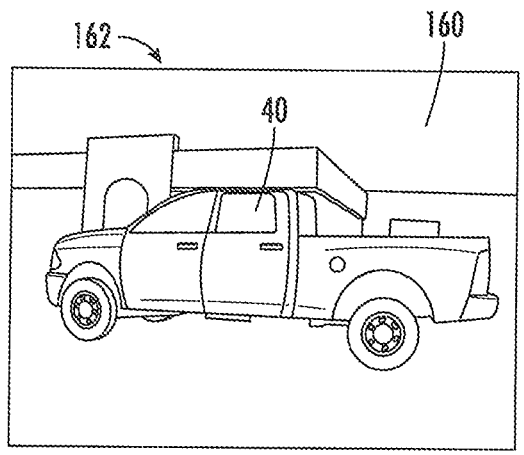
FIG. 12A is a captured and unaltered image of a vehicle, in accordance with one or more aspects of the present disclosure.
Figure 12B:
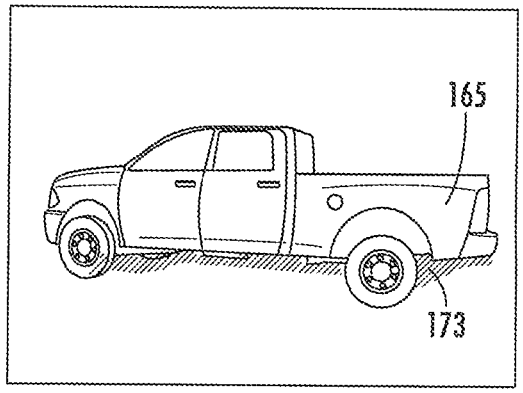
FIG. 12B is the captured image of FIG. 12A, shown with the subject segmented out of the image by machine learning and artificial intelligence, in accordance with one or more aspects of the present disclosure.
Figure 12C:
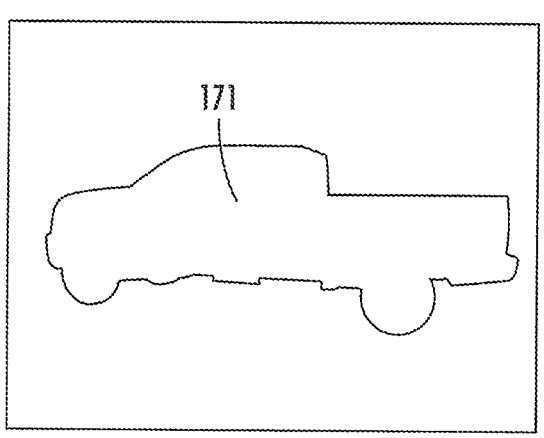
FIG. 12C is the segmented image FIG. 12B, shown with the vehicle image removed to show the new location for placement of the segmented vehicle image by machine learning and artificial intelligence, in accordance with one or more aspects of the present disclosure.
Figure 12D:
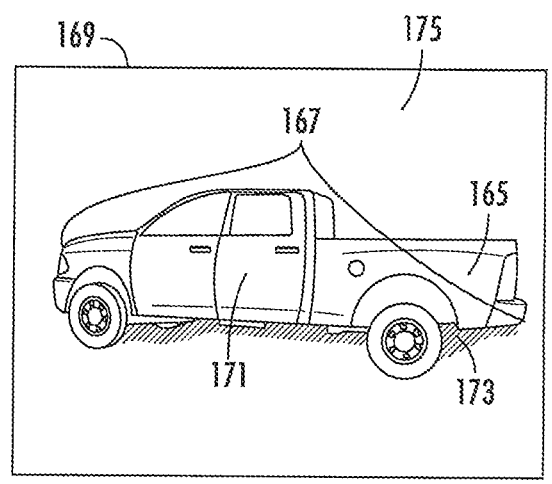
FIG. 12D is the segmented image FIG. 12B, shown with the vehicle image repositioned in the new predetermined position by machine learning and artificial intelligence, in accordance with one or more aspects of the present disclosure.

The background segmentation process begins with AI/ML module 74 using contextual image classification and machine learning to identify patterns in images 30 based on contextual information in images 30, such as the groupings of pixels surrounding a target pixel to differentiate 158 vehicle 40 within image 30 from background 160 within image 30. For example, as shown in FIGS. 1, and 12A-D, AI/ML module 74 receives 72 images 30 from dealer 28, and in a selected image 162 differentiates 158 the vehicle 40 from background 160 in image 162. Once vehicle 40 and background 160 have been separated, as shown in FIGS. 12C-D, AI/ML module 74 segments 164 image 162 by identifying all background 160 in image 162 that is not vehicle 40, and removing background 160 from image 162, leaving only vehicle 40. Segmentation can be further used to identify any blemishes or damage on the vehicle, to which the system can automatically associate with tags and/or hotspots. Preferably, the system 10 automatically identifies one or more locations in the image 162 and automatically associates that location with a visibly perceptible damage indicator, such as a hotspot associated with the image. AI/ML module 74 adds a metadata value to the associated image file (not shown) associating details, such as type of damage, location of the damage within image 30, with the image 30 itself.

Segmentation is used in association with automatic relocation of the image 165 that has been separated from the background. The image 165 relocation process begins with AI/ML module 74 using contextual image classification and machine learning to identify patterns in images 165 based on contextual information in the image, such as the groupings of pixels surrounding a target pixel to differentiate a foreground image of vehicle 40 from the background image. Once the foreground image of the vehicle 40 is identified, AI/ML module 74 uses contextual image classification and machine learning to locate the foreground image by calculating "anchor data" location information 167 about the foreground image, such as the X and Y coordinate locations of the upper leftmost point and lower rightmost point of the foreground image, as well as the height and width of the foreground image. As each image 30 is segmented 164, AI/ML module 74 adds a metadata value to the associated image file (not shown) indicating details about the segmentation, such as the anchor data location information, the type of new background to be added, the addition of shadows to the image, etc. As the system 10 adds metadata to the associated image file, AI/ML module 74 uses the metadata value relating to the location of the foreground to relocate the foreground and replace the background. AI/ML module 74 automatically uses the anchor data location information 167 to center the image 165 around a location 171 in the modified image 169 predetermined by vehicle dealer 28 for the particular classification of the image 165, such as vehicle, or subclassification, such as car, truck, etc. AI/ML module 74 automatically uses maximum height and width parameters predetermined by vehicle dealer 28 or otherwise, to resize the image 165 within the predefined size parameters. AI/ML module 74 automatically may also automatically tilt or otherwise adjust the image 165 according to parameters, as predetermined by vehicle dealer 28 or otherwise. If desired, system 10 may add a shadow 173 and a new background 175 to image 169, such as a rural or urban setting, a solid color, or any other desired effect known in the art.

After segmenting image 162, AI/ML module 74 determines 166 if there are any more images 30 that have not been segmented. For example, if AI/ML module 74 determines 166 there are additional images 30 to segment, system 10 returns to step 158 to classify the next image 30. The system 10 continues in this manner until AI/ML module 74 has segmented all images 30 that need to be segmented, at which point the module 74 determines 168 if it is desired to add any hotspots 170 to images 30. Similarly, if AI/ML module 74 has determined 168 that no images 30 are to be segmented, the module 74 also determines 168 if it is desired to add any hotspots 170 to images 30.

Figure 16:
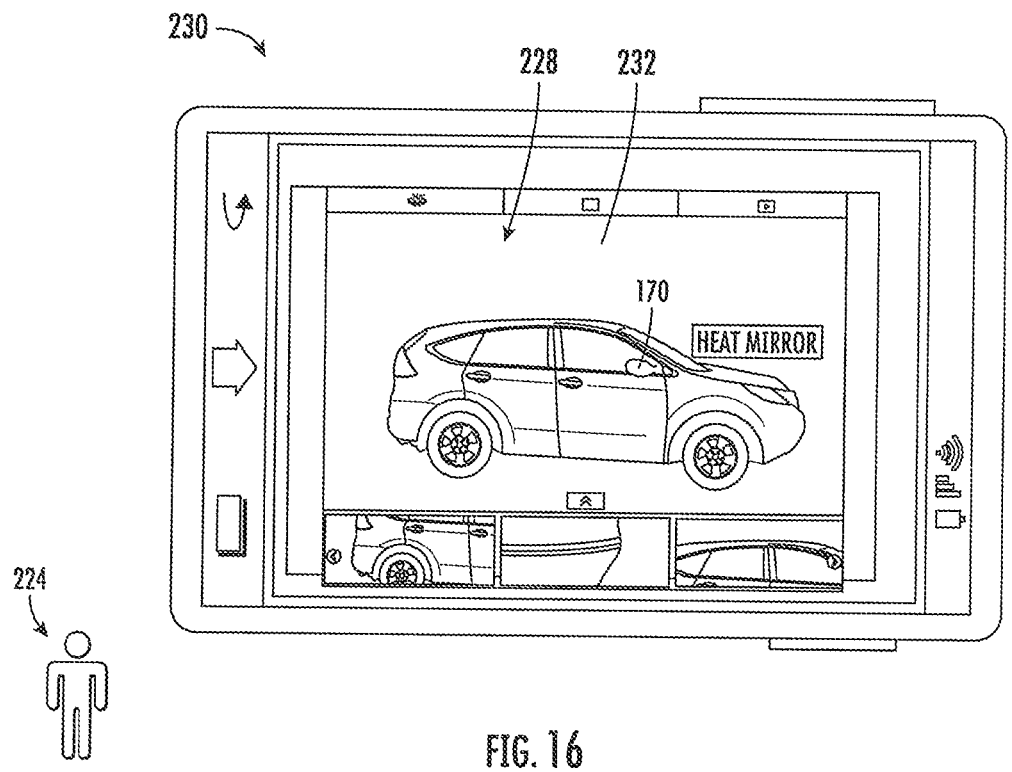
FIG. 16 is a display of an end user computing device displaying an unsequenced image, in accordance with one or more aspects of the present disclosure.
Figure 17:
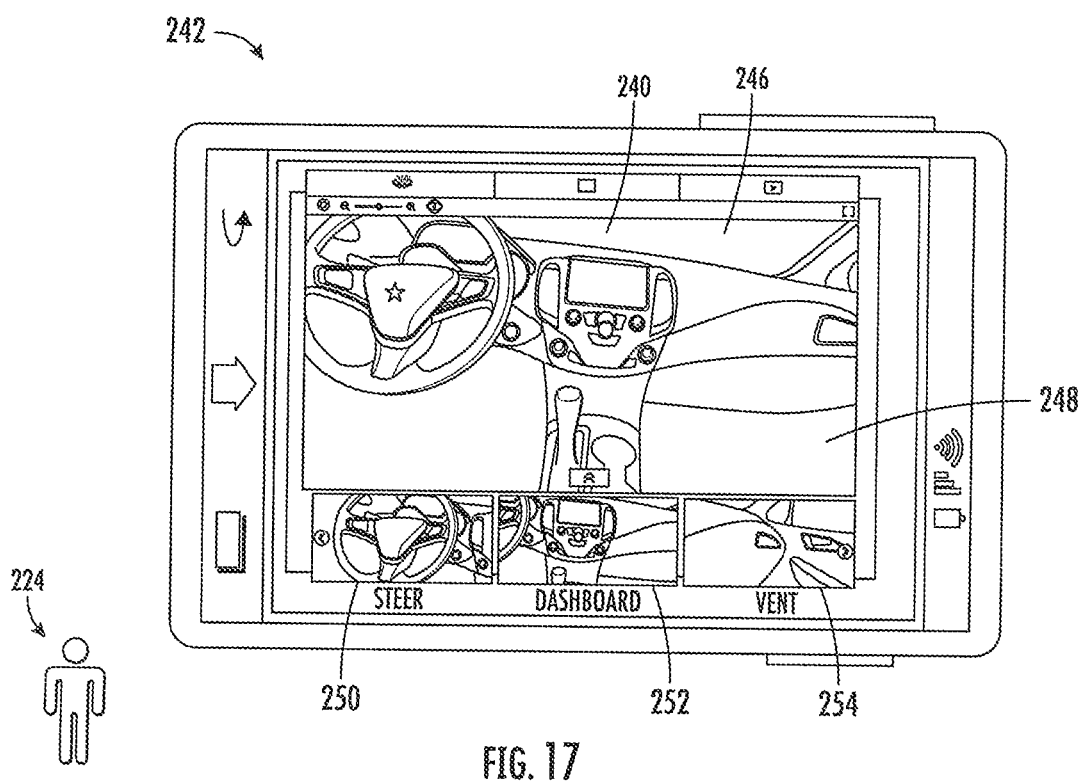
FIG. 17 is a display of an end user computing device displaying a series of sequenced images, in accordance with one or more aspects of the present disclosure.

To add hotspots 170 to images 30, AI/ML module 74 accesses 172 ISS 12 to retrieve a file 174 containing a list of media, as well as a list of those objects in images 30 both predetermined by vehicle dealer 28 or otherwise, to be associated with the media via a hotspot 170. FIGS. 1 and 16. The media may be audio, video, text, or any other media known in the art.

In an exemplary embodiment, AI/ML module 74 uses previously identified objects 76 in images 30, contextual information, and machine learning to identify 174 objects 76 from file 176 to be associated with hotspots 170. FIGS. 1, 4A-B, and 13, 16. For example, AI/ML module 74 may determine, based on file 174 and previously identified objects 76 in first image 52 that a hotspot 170 needs to be added to the image of side mirror 118 in image 30 to indicate that the side mirror 118 is heated and to indicate the method of operating the heating function. AI/ML module 74 uses previously identified object of side mirror 118 and adds 178 a hotspot 170 to first image 52 that when hovered over with a cursor reveals text indicating that side mirror 118 is heated and when clicked launches a video explaining the method of operation of the heating function. Alternatively, AI/ML module 74 may use contextual image classification and machine learning to identify patterns in first image 52 based on contextual information in image 52, such as the groupings of pixels surrounding a target pixel in a manner such as that described above in relation to identifying 82 targets 84, albeit using target to identify objects 76 to associate with added hotspots 170. As each hotspot 170 is added 178 to an image 30, AI/ML module 74 adds a metadata value to the associated image file (not shown) indicating details about the hotspot, such as the location of the hotspot 170, the associated object 76, the type of hotspot, etc.

After AI/ML module 74 adds 178 a hotspot 170 to first image 52, the module 74 uses file 176 to determine 180 if there are any more hotspots 170 to add to the first image 52, in which case the system returns to step 172 to add an additional hotspot 170. If AI/ML module 74 determines 180 there are no more hotspots 170 to add to the first image 52, the module 74 determines 182 if there are any more images 30 that need added hotspots 170 and, if so, returns to step 168 to examine the next image 30 needed hotspot annotation. The system 10 continues in this manner until AI/ML module 74 has added all hotspots 170 from file 176 to images 30, at which point the module 74 determines uses information collected in classification chart 142 to determine 184 if any overlays, such as banners 186, are to be added to the image 30.

Figure 13:
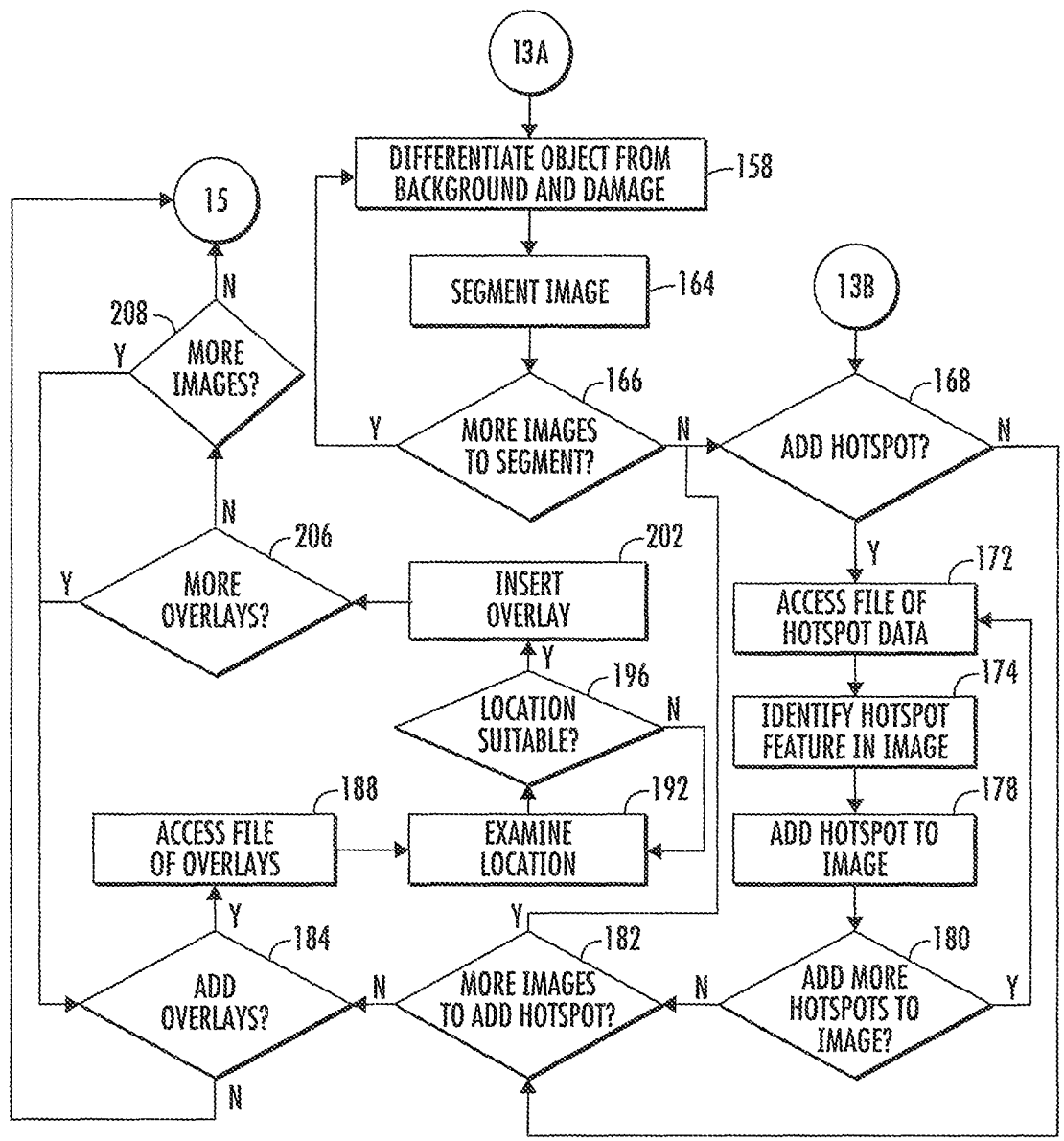
FIG. 13 is a flowchart illustrating example machine learning and artificial intelligence segmentation and hotspot operations performed by an example computing system, in accordance with one or more aspects of the present disclosure.
Figure 14:
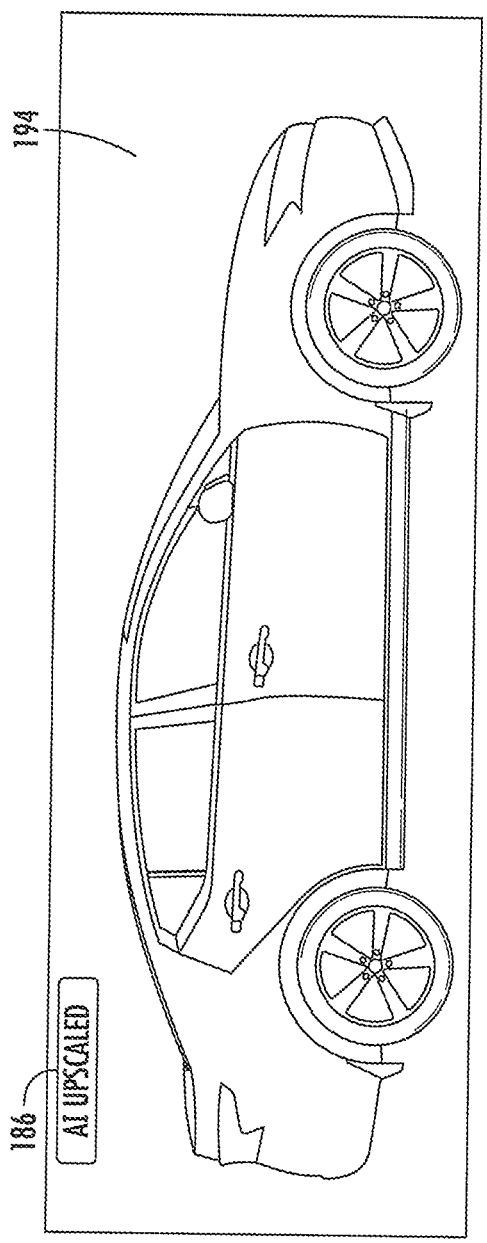
FIG. 14 is an image illustrating an example machine learning and artificial intelligence overlay operations performed on an image by an example computing system, in accordance with one or more aspects of the present disclosure.

To add overlays, such as a banner 186 to images 30, AI/ML module 74 accesses 188 ISS 12 to retrieve a file 174 containing a list of overlays to be added to images 30, as well as files containing the overlays, both predetermined by vehicle dealer 28 or otherwise. FIGS. 1 and 13, 16. The overlays may be banners 186 or any desired overlay known in the art In an exemplary embodiment, AI/ML module 74 examines 192 a location 194 in image 30, as predetermined by vehicle dealer 28 or otherwise. AI/ML module 74 then determines 196 if the location 194 is suitable for insertion of the banner 186. AI/ML module 74 may use contextual image classification, object identification, and machine learning to identify patterns in image 30 based on contextual information in image 30, such as the groupings of pixels surrounding a target pixel in a manner such as that described above in relation to identifying 82 targets 84, albeit using target to identify conflict images, namely objects 198 that would make insertion of banner 186 in location 194 undesirable. Objects 198 that could make the application of banner 186 in location 194 unacceptable may include the presence of vehicle dealer signage at the location, similarly colored background 200, portions of vehicle 40 in location 194, orientation of the vehicle 40 in the image 30, etc.

In the event AI/ML module 74 determines 196 application of banner 186 in location 194 is acceptable, AI/ML module 74 inserts 202 banner 186 in location 194. In the event AI/ML module 74 determines 196 application of banner 186 in location 194 is unacceptable, AI/ML module 74 returns to step 192 examining an alternative location 204 in image 30, as predetermined by vehicle dealer 28 or otherwise. AI/ML module 74 once again determines 196 if the alternative predetermined location 204 is suitable for insertion of the banner 186. AI/ML module 74 again uses contextual image classification, object identification, and machine learning to identify patterns in image 30 based on contextual information in image 30, such as the groupings of pixels surrounding a target pixel in a manner such as that described above in relation to identifying 82 targets 84, using the target to identify objects that would make insertion of banner 186 in alternative predetermined location 204 undesirable. This process continues until AI/ML module 74 locates a suitable location for insertion of the banner 186. Once AI/ML module 74 determines 196 application of banner 186 in location 194 is acceptable, AI/ML module 74 inserts banner 186 at the acceptable location 204 and determines 206 if any more overlays are to be added. As each overlay is added 178 to an image 30, AI/ML module 74 adds a metadata value to the associated image file (not shown) indicating details about the overlay, such as the location of the overlay, the type of overlay, etc.

Figure 15:
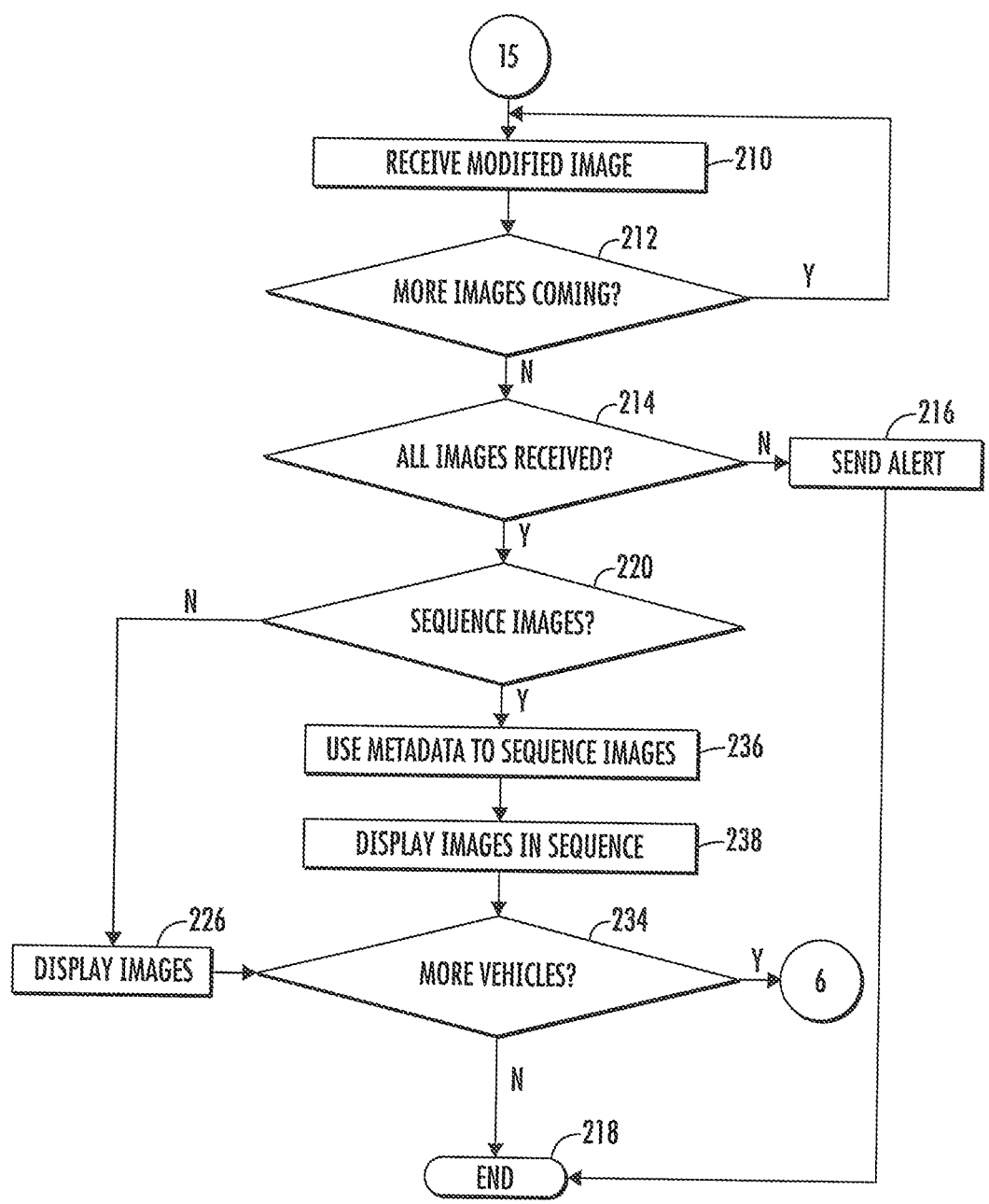
FIG. 15 is a flowchart illustrating example machine learning and artificial intelligence sequencing operations performed by an example computing system, in accordance with one or more aspects of the present disclosure.

If more overlays are to be added, AI/ML module 74 returns to step 184 and continues processing until no more overlays are to be added. Once AI/ML module 74 determines 206 no more overlays are to be added, AI/ML module 74 determines 208 if more images 30 need overlays added. If more images 30 need overlays added, AI/ML module 74 returns to step 184 and continues processing until no more images 30 need overlays added. Once no more images 30 need overlays added, AI/ML module 74 receives 210 the modified image for display. FIGS. 1, 13, 15. AI/ML module 74 determines 212 if more images 30 will be received. If more images will be received, the process returns to step 210. If no more images will be received, AI/ML module 74 determines 214 if a number and type of images 30 predetermined by vehicle dealer 28 or otherwise has been received. If AI/ML module 74 determines 214 that the number and type of images 30 predetermined by vehicle dealer 28 or otherwise have not been received, AI/ML module 74 sends 216 an alert (not shown) to vehicle dealer 28 indicating additional images 30 are needed. The alert may be a text, sound, or any type of audio, visual, or haptic alert known in the art. Preferably the alert indicates to vehicle dealer 28 exactly which type of images 30 are missing and needed.

Alternatively, AI/ML module 74 may use machine learning to automatically identify a subitem, such as a driver's door, making up all or part of an item 32, such as a vehicle, in an existing image 30, then automatically crop and resize all or part of the subitem in the image 30 to create a subimage, then upscale the image by using machine learning to sharpen the subimage, thereby generating a cropped, resized, and upscaled subimage as a substitute for the missing image. For example, if AI/ML module 74 was missing an image 30 with a classification of "driver door" AI/ML module 74 may be able to automatically take an image of the driver side of the vehicle, and use contextual image classification, object identification, and machine learning as described above to identify patterns in image 30 based on contextual information in image 30, to crop, enlarge, and enhance (through machine learning or otherwise) the portion of the driver side of the vehicle containing the door to produce the missing image. Whenever AI/ML module 74 crops, resizes, and/or sharpens an image 30, AI/ML module 74 adds a metadata value to the associated image file (not shown) indicating details about the modification, such as the type of modification, location of the original image file, etc. Whenever AI/ML module 74 created a new image 30 AI/ML module 74 generates a new image file for the image and adds to that image file a metadata value indicating details about the new image generation, such as the original file location, any modifications, etc. In the event AI/ML module 74 cannot generate the missing image, the process ends 218 after AI/ML module 74 sends the alert informing a user of the missing image.

If AI/ML module 74 determines 214 that the predetermined number and type of images 30 have been received, AI/ML module 74 determines 220 whether the images 30 must be sequenced for display. FIGS. 1, 15. If vehicle dealer 28 has previously indicated sequencing is not desired, AI/ML module 74 automatically uploads 222 the images 30, as modified by the foregoing processes, on a website (not shown), thereby allowing end users 224 to display 226 the images 30, as modified above, on displays 228 of their computing devices 230, and select hotspots 170 in the images 30 using a touchscreen 232, touchpad, mouse, or any device known in the art, to obtain additional information regarding various objects associated with vehicles 40 shown in the images 30. AI/ML module 74 then determines 234 if there are more vehicles with images 30 to be processed. If there are, the process returns to step 70. If not, AI/ML module 74 ends 218 the process.

If, however, vehicle dealer 28 has previously programmed AI/ML module 74 to sequence images 30, then AI/ML module 74 automatically uses the metadata described above and previously associated with the images 30 to sequence 236 the images 30 as predetermined by vehicle dealer 28 or otherwise. FIGS. 1, 15. For example, if vehicle dealer 28 has programmed AI/ML module 74 to sequence images 30 to display an image of the driver side of vehicle 40 first, then an image of the passenger side of the vehicle, and finally an image of the front of the vehicle, AI/ML module 74, working from those instructions, automatically accesses the classification metadata associated with images 30, determines which images 30 of the vehicle 40 are of the driver side, passenger side, and front, sequences 236 the images 30 in that order, and uploads the images 30, along with all of the foregoing modifications to images 30, to a website (not shown), thereby allowing end users 224 to display 238 the images 30, as modified above, in the predetermined order (vertically, horizontally, or otherwise) on displays 240 of their computing devices 242 to create an interactive gallery of images 244 which, as shown may be of the vehicle's interior, and allow the end user 224 to select hotspots 170 in the images 30 using a touchscreen 246, touchpad, mouse, or any device known in the art. FIGS. 1, 15, 16, 17. The interactive gallery of images 244 may sequence the images 30 to position one image 248 at the top of the webpage, taking up most of the display 240, and positioning the other images 250, 252, and 254 in the predetermined sequence below the main image 248. After displaying 238 images 30, AI/ML module 74 then determines 234 if there are more vehicles with images 30 to be processed. If there are, the process returns to step 70. If not, AI/ML module 74 ends 218 the process.

Although the foregoing embodiment explains a method for using artificial intelligence and machine learning to automatically receive, modify, sequence, and display images of vehicles, it is possible to use the foregoing processes to automatically receive, modify, sequence, and display images for marketing most goods and services.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. At least one non-transitory computer-readable storage medium having computer-executable instructions stored thereon which, when executed by a computer, causes the computer to perform a method comprising:
   receiving a plurality of images, wherein the plurality of images comprises:
      a first image comprising at least a first item having a first object;
      a second image comprising at least a second item having a second object; and
      wherein the first item is different than the second item;
   automatically analyzing the first image to identify a first object in the first image as a first identification using artificial intelligence machine learning;
   creating a first metadata value associating the first image and the first identification;
   automatically using the first object to analyze the first image to classify a first item image within the first image as a first classification using artificial intelligence machine learning;
   creating a second metadata value associating the first image and the first classification;
   automatically analyzing the second image to identify a second object in the second image as a second identification using artificial intelligence machine learning;
   creating a third metadata value associating the second image and the second identification;
   automatically using the second object to analyze the second image to classify the second item image within the second image as a second classification using artificial intelligence machine learning;
   creating a fourth metadata value associating the second image and a second classification;
   receiving a predetermined instruction from a user relating to a preferred display sequence of the first image and the second image; and
   using the second metadata value and the fourth metadata value to automatically arrange and display the first modified image and the second modified image in a sequence associated with the preferred display sequence.

2. The at least one non-transitory computer-readable storage medium of claim 1 which, when executed by a computer, causes the computer to perform the method further comprising:
automatically analyzing the first image to determine a first location of a first foreground in the first image using artificial intelligence machine learning;
creating a fifth metadata value associating the first image and the first location;
automatically using the fifth metadata value and the first image to create a first modified image having a relocated first foreground and a predetermined background;
automatically analyzing the second image to determine a second location of a second foreground in the second item using artificial intelligence machine learning;
creating a sixth metadata value associating the second image and the second location; and
automatically using the sixth metadata value and the second image to create a second modified image having a relocated second foreground and the predetermined background.

3. The at least one non-transitory computer-readable storage medium of claim 2, further comprising associating a hotspot with the first object.

4. The at least one non-transitory computer-readable storage medium of claim 2, wherein automatically using the fifth metadata value and the first image to create a first modified image having a relocated first foreground and a predetermined background further comprises;
wherein the first foreground is the first item;
automatically identifying an X coordinate associated with the first item;
automatically identifying a Y coordinate associated with the first item;
automatically using the X coordinate and the Y coordinate to relocate the first item within the first modified image;
automatically resizing the item within the first modified image to position the item within a predefined size parameter associated with the first classification.

5. The at least one non-transitory computer-readable storage medium of claim 1 which, when executed by a computer, causes the computer to perform the method further comprising:
automatically identifying a subitem within the first item using artificial intelligence machine learning;
automatically cropping the subitem from the first item to create a cropped subimage;
creating a fifth metadata value associating the subitem and the cropped subimage;
automatically using the fifth metadata value and the cropped subimage to create a modified subimage having a modified background;
using the first metadata value, the fourth metadata value, and the seventh metadata value to automatically arrange the first modified image, the second modified image, and the modified subitem image and produce the user-identifiable output associated with the predetermined instruction, using the second metadata value, the fourth metadata value, and the fifth metadata value to automatically arrange and display the first modified image, the second modified image, and the modified subimage in a sequence associated with the preferred display sequence.

6. The at least one non-transitory computer-readable storage medium of claim 1 which, when executed by a computer, causes the computer to perform the method further comprising:
automatically analyzing a first predetermined area of the first image for the existence of a conflict image, using artificial intelligence machine learning;
automatically, in response to identification of a conflict image in the first predetermined area of the first image, adding an overlay to a second predetermined area of the first image using artificial intelligence machine learning; and
wherein the first modified image comprises the overlay in the second predetermined area of the first image.

7. The at least one non-transitory computer-readable storage medium of claim 1 which, when executed by a computer, causes the computer to perform the method further comprising:
automatically upscaling the first item into an upscaled item using artificial intelligence machine learning; and
wherein the first modified image comprises the upscaled item.

8. The at least one non-transitory computer-readable storage medium or claim 1 which, when executed by a computer, causes the computer to perform the method further comprising:
automatically analyzing the first image to identify a third object in the first image as a third identification using artificial intelligence machine learning;
creating a fifth metadata value associating the first image and the third identification; and
automatically using the fifth metadata value to remove the third object from the first modified image using artificial intelligence machine learning.

9. The at least one non-transitory computer-readable storage medium of claim 8 wherein the third object is an image of a license plate.

10. The at least one non-transitory computer-readable storage medium of claim 8 wherein the third object is an image of a sticker.

11. The at least one non-transitory computer-readable storage medium of claim 1 which, when executed by a computer, further causes the computer to perform the method comprising:
automatically analyzing the first metadata value and the second metadata value to identify a missing image based upon the predetermined instruction; and
automatically displaying an alert identifying the missing image.

12. At least one non-transitory computer-readable storage medium having computer-executable instructions stored thereon which, when executed by a computer, causes the computer to perform a method comprising:
receiving a plurality of images, wherein the plurality of images comprises:
a first image of at least a first item having a first object;
a second image of at least a second item having a second object; and
wherein the first item is different than the second item;
automatically analyzing the first image to locate the first item within the first image as a first location using artificial intelligence machine learning;
automatically analyzing the first image to identify the first object in the first image as a first identification using artificial intelligence machine learning;
automatically using the first object to classify the first image as a first classification using artificial intelligence machine learning;
creating a first metadata value associating the first image and the first location;

creating a second metadata value associating the first image and the first identification;
creating a third metadata value associating the first image and the first classification;
automatically using the first image and the first metadata value to create a first modified image having a modified background;
automatically using the first image and the second metadata value to associate a first hotspot with the second modified image;
automatically analyzing the second image to locate the second item within the second image as a second location using artificial intelligence machine learning;
automatically analyzing the second image to identify the second object in the second image as a second identification using artificial intelligence machine learning;
automatically using the second object to classify the second image as a second classification using artificial intelligence machine learning;
creating a fourth metadata value associating the second image and the second location;
creating a fifth metadata value associating the second image and the second identification;
creating a sixth metadata value associating the second image and the second classification;
automatically using the second image and the fourth metadata value to create a second modified image having a modified background;
automatically using the second image and the fifth metadata value to associate a second hotspot with the second modified image;
receiving a predetermined instruction from a user relating to display of the first image and the second image; and
using the third metadata value and the sixth metadata value to automatically arrange and display the first modified image and the second modified image in a visually-identifiable sequence associated with the predetermined instruction.

13. The at least one non-transitory computer-readable storage medium of claim 12, wherein the visually-identifiable sequence is a display of the first modified image and the second modified image in a sequence associated with the predetermined instruction.

14. The at least one non-transitory computer-readable storage medium of claim 12, wherein the item is a vehicle and wherein the first object is a feature of the vehicle.

15. The at least one non-transitory computer-readable storage medium of claim 12 which, when executed by a computer, causes the computer to perform the method further comprising:
automatically analyzing the first image to identify a third object in the first image as a first identification using artificial intelligence machine learning; and
automatically removing the third object from the first image using artificial intelligence machine learning.

16. At least one non-transitory computer-readable storage medium having computer-executable instructions stored thereon which, when executed by a computer, causes the computer to perform a method comprising:
receiving a plurality of images, wherein the plurality of images comprises:
a first image of a first rotational orientation of a first item;
a second image of a second rotational orientation of the first item;
wherein the first rotational orientation is different than the second rotational orientation;
enabling a user to select a predetermined instruction to input of the first image and the second image;
automatically analyzing the first image to identify a first object in the first image using artificial intelligence machine learning;
automatically creating a first metadata value associated with the first object in the first image and associating the first metadata value with the first image;
automatically analyzing the second image to identify a second object in the second image using artificial intelligence machine learning;
automatically creating a second metadata value associated with the second object in the second image and associating the second metadata value with the second image;
automatically using the first metadata value and the second metadata value to automatically produce a user-identifiable output associated with the predetermined instruction.

17. The at least one non-transitory computer-readable storage medium of claim 16, wherein the item is a vehicle and wherein the first object is a feature of the vehicle.

18. The at least one non-transitory computer-readable storage medium of claim 16, wherein the user-identifiable output is a display of a first modified image created from upscaling the first image using artificial intelligence machine learning and a second modified image created from upscaling the second image using artificial intelligence machine learning, and wherein the user-identifiable output is a predetermined sequence of the first modified image and the second modified image.

19. The at least one non-transitory computer-readable storage medium of claim 18 which, when executed by a computer, further causes the computer to perform the method comprising:
automatically analyzing the first image to identify a first background surrounding the first item in the first image;
automatedly removing the first background from the first image;
automatically replacing the first background from the first image with a second background; and
wherein the first modified image comprises the second background.

20. The at least one non-transitory computer-readable storage medium of claim 19 wherein the first modified image comprises the first item relocated within the first image using artificial intelligence machine learning.

* * * * *